(12) United States Patent
Yoon et al.

(10) Patent No.: US 12,175,655 B2
(45) Date of Patent: Dec. 24, 2024

(54) SUBSTRATE INSPECTION METHOD AND DEVICE

(71) Applicant: Samsung Electronics Co., Ltd., Suwon-si (KR)

(72) Inventors: Doyoung Yoon, Seoul (KR); Junghoon Kim, Seoul (KR); Ilsuk Park, Hwaseong-si (KR); Kwangil Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 471 days.

(21) Appl. No.: 17/668,622

(22) Filed: Feb. 10, 2022

(65) Prior Publication Data

US 2023/0033089 A1 Feb. 2, 2023

(30) Foreign Application Priority Data

Jul. 30, 2021 (KR) .................. 10-2021-0100682

(51) Int. Cl.
*G06T 7/00* (2017.01)
*G06V 10/14* (2022.01)
*G06V 10/22* (2022.01)

(52) U.S. Cl.
CPC .............. *G06T 7/001* (2013.01); *G06V 10/14* (2022.01); *G06V 10/22* (2022.01); *G06T 2207/10061* (2013.01); *G06T 2207/30148* (2013.01)

(58) Field of Classification Search
CPC ........... G06T 7/001; G06T 2207/10061; G06T 2207/30148; G06T 7/0004; G06T 7/11;
(Continued)

(56) References Cited

U.S. PATENT DOCUMENTS 7,196,782 B2    3/2007  Fielden et al.
9,176,074 B2 *  11/2015 Fujii .................... G06T 7/0004
(Continued)

FOREIGN PATENT DOCUMENTS

JP       2012169571 A     9/2012

*Primary Examiner* — Oneal R Mistry
*Assistant Examiner* — Jongbong Nah
(74) *Attorney, Agent, or Firm* — MORGAN, LEWIS & BOCKIUS LLP

(57) ABSTRACT

A substrate inspection method includes: (i) acquiring a plurality of defect of interest (DOI) images of a substrate having a DOI, under a corresponding plurality of different optical conditions, (ii) acquiring a plurality of DOI difference images from differences between the plurality of DOI images and a reference image, and (iii) acquiring a plurality of DOI difference-of-difference (DOD) images from differences between the plurality of DOI difference images. The method also includes setting two optical conditions corresponding to a DOI DOD image having the highest signal-to-noise ratio (SNR) among the plurality of DOI DOD images, as a first optical condition and a second optical condition, and acquiring a first image of the substrate under the first optical condition and a second image of the substrate under the second optical condition. A first difference image is also acquired, which is a difference between the first image and the reference image, and a second difference image is acquired, which is a difference between the second image and the reference image. A DOD image is acquired that is a difference between the first difference image and the second difference image. A low-SNR defect candidate region is then detected from the first difference image, the second difference image, and the DOD image.

20 Claims, 22 Drawing Sheets

(58) Field of Classification Search
CPC ........ G06V 10/14; G06V 10/22; G06V 10/25; G01N 21/8851; G01N 21/8806; G01N 21/956; G01N 2021/8858; G01N 2021/8864; G01N 2021/8887
See application file for complete search history.

(56) References Cited

U.S. PATENT DOCUMENTS

| | | | |
|---|---|---|---|
| 9,529,182 B2 * | 12/2016 | Chuang | H01S 3/0092 |
| 9,733,194 B2 | 8/2017 | Otani et al. | |
| 10,401,300 B2 * | 9/2019 | Otani | G01B 15/08 |
| 2020/0003700 A1 * | 1/2020 | Sofer | G01N 21/95607 |
| 2020/0025689 A1 | 1/2020 | Gaind et al. | |
| 2020/0193588 A1 * | 6/2020 | Brauer | G06V 10/764 |

* cited by examiner

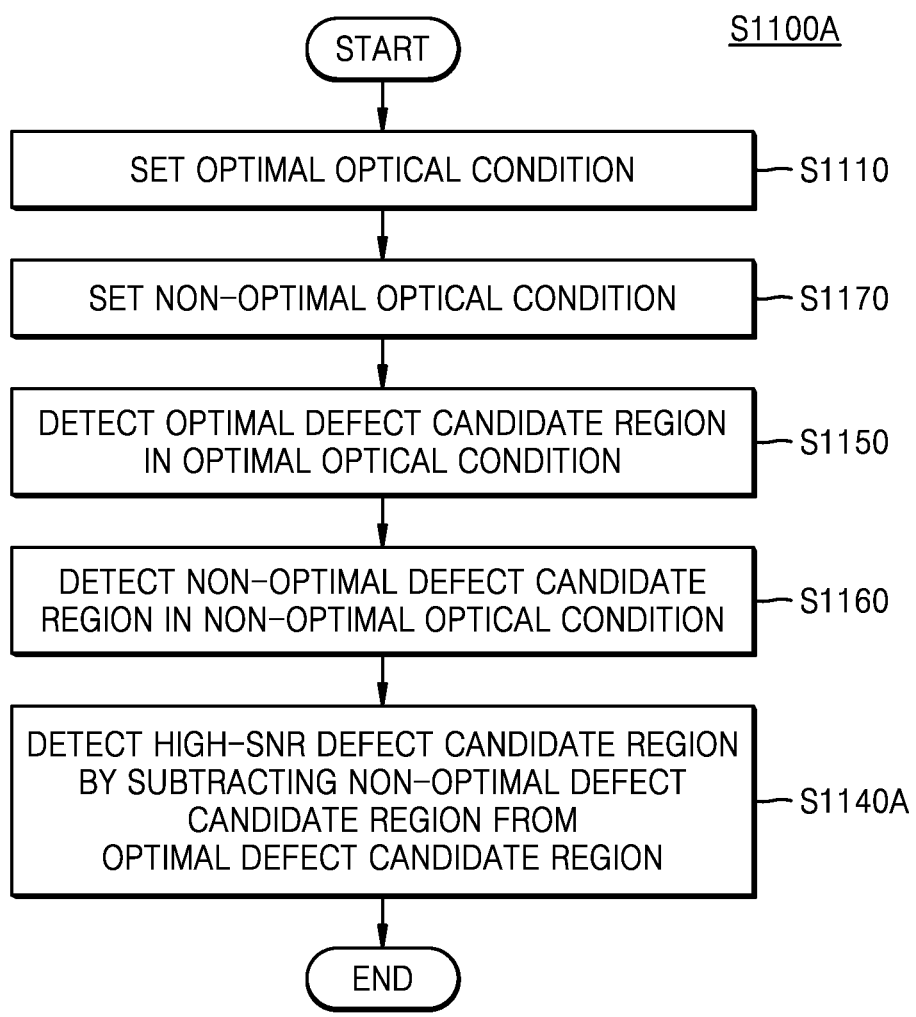

- PROCESS DISTRIBUTION IMAGE ACQUISITION SUBMODULE — 2171B
- PROCESS DISTRIBUTION DIFFERENCE IMAGE ACQUISITION SUBMODULE — 2172B
- PROCESS DISTRIBUTION DEFECT DIFFERENCE IMAGE COMPARISON SUBMODULE — 2173B

SUBSTRATE INSPECTION METHOD AND DEVICE

REFERENCE TO PRIORITY APPLICATION

This application claims priority under 35 U.S.C. § 119 to Korean Patent Application No. 10-2021-0100682, filed Jul. 30, 2021, the disclosure of which is hereby incorporated herein by reference.

BACKGROUND

The inventive concept relates to a substrate (e.g., wafer) inspection method and device and, more particularly, to methods and devices for detecting defect(s) in a substrate from optical images thereof.

A particular region having a high signal to noise ratio (SNR) in a difference image, which is a difference between an image of a substrate and a reference image, may be detected as a defect candidate region. However, when a noise level is high because of an uninterested defect, a process distribution, or the like, and not by a defect of interest (DOI), an SNR of a defect region in which there is an actual DOI may be less than 1. In this case, the actual DOI may not be detectable using a conventional inspection method. Instead, a region in which there is no DOI may be detected as a defect candidate region because of an uninterested defect or a process distribution, for example.

SUMMARY

The inventive concept provides substrate inspection methods and devices having an improved defect detection performance.

According to some embodiments of the inventive concept, a substrate inspection method includes: (i) acquiring a plurality of defect of interest (DOI) images of a substrate having a DOI, under a plurality of optical conditions, (ii) acquiring a plurality of DOI difference images that are based on differences between the plurality of DOI images and a reference image; (iii) acquiring a plurality of DOI difference-of-difference (DOD) images that are based on differences between the plurality of DOI difference images; (iv) setting, as a first optical condition and a second optical condition, two optical conditions corresponding to a DOI DOD image having the highest signal to noise ratio (SNR) among the plurality of DOI DOD images; (v) acquiring a first image of the substrate under the first optical condition and a second image of the substrate under the second optical condition; (vi) acquiring a first difference image based on a difference between the first image and the reference image, and a second difference image based on a difference between the second image and the reference image; (vii) acquiring a DOD image based on a difference between the first difference image and the second difference image; and (viii) detecting a low-SNR defect candidate region from the first difference image, the second difference image, and the DOD image.

According to additional embodiments of the inventive concept, a substrate inspection device includes: (i) a defect of interest (DOI) image acquisition submodule, which is configured to acquire a plurality of DOI images of a substrate having a DOI under a plurality of optical conditions; (ii) a DOI difference image acquisition submodule, which is configured to acquire a plurality of DOI difference images based on differences between the plurality of DOI images and a reference image; (iii) a DOI difference-of-difference (DOD) image acquisition submodule, which is configured to acquire a plurality of DOI DOD images based on differences between the plurality of DOI difference images; (iv) a DOI DOD image comparison submodule, which is configured to set, as a first optical condition and a second optical condition, two optical conditions corresponding to a DOI DOD image having the highest signal to noise ratio (SNR) among the plurality of DOI DOD images; (v) an image acquisition module, which is configured to acquire a first image of the substrate under the first optical condition and a second image of the substrate under the second optical condition; (vi) a difference image acquisition module, which is configured to acquire a first difference image based on a difference between the first image and the reference image, and a second difference image based on a difference between the second image and the reference image; (vii) a DOD image acquisition module, which is configured to acquire a DOD image based on a difference between the first difference image and the second difference image; and (viii) a low-SNR defect candidate region detection module, which is configured to detect a low-SNR defect candidate region from the first difference image, the second difference image, and the DOD image.

According to additional embodiments of the inventive concept, a substrate inspection method includes: (i) detecting a high-signal to noise ratio (SNR) defect candidate region; (ii) detecting a low-SNR defect candidate region; and (iii) determining, by using an electron microscope, whether there is a defect in the low-SNR defect candidate region and/or the high-SNR defect candidate region. The operations of detecting the low-SNR defect candidate region include: (i) setting a first optical condition and a second optical condition, (ii) acquiring a first image of a substrate under the first optical condition and a second image of the substrate under the second optical condition, (iii) acquiring a first difference image based on a difference between the first image and a reference image, and a second difference image based on a difference between the second image and the reference image, (iv) acquiring a difference of difference (DOD) image based on a difference between the first difference image and the second difference image; and (v) detecting the low-SNR defect candidate region from the first difference image, the second difference image, and the DOD image. In addition, the operations of detecting of the high-SNR defect candidate region include: (i) acquiring an optimal image of the substrate in an optimal optical condition, (ii) acquiring an optimal difference image based on a difference between the optimal image and the reference image, and (iii) acquiring the high-SNR defect candidate region from the optimal difference image.

BRIEF DESCRIPTION OF THE DRAWINGS

Embodiments of the inventive concept will be more clearly understood from the following detailed description taken in conjunction with the accompanying drawings in which:

FIG. 4 is a flowchart illustrating an operation of detecting a high-SNR defect candidate region, according to an embodiment of the inventive concept;

FIG. 25 is a block diagram illustrating a non-optimal optical condition setting module according to an embodiment of the inventive concept;

DETAILED DESCRIPTION OF THE EMBODIMENTS

Figure 1:
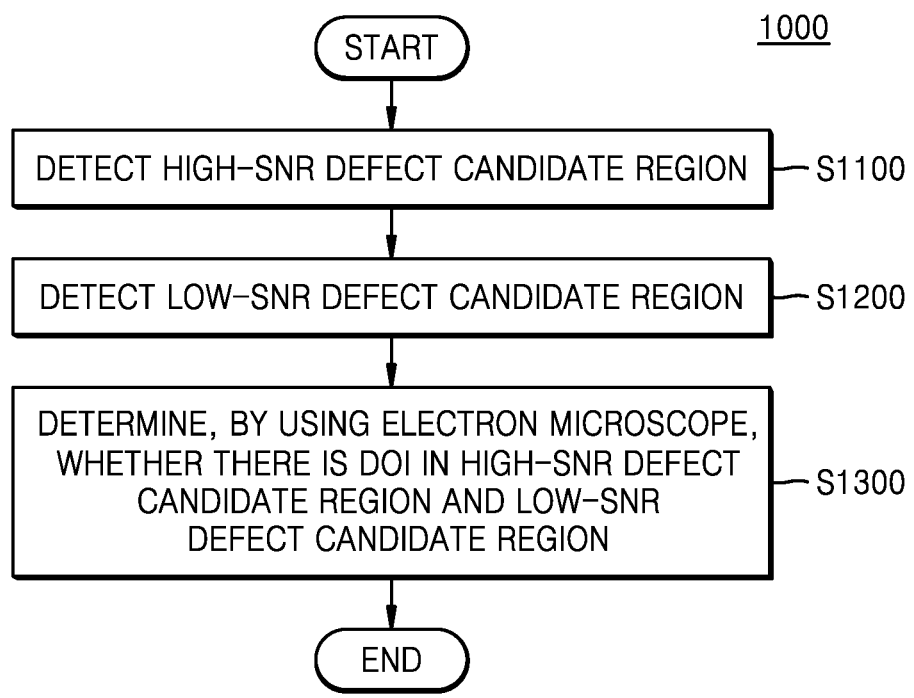
FIG. 1 is a flowchart illustrating a substrate inspection method according to an embodiment of the inventive concept.

FIG. 1 is a flowchart illustrating a substrate inspection method 1000 according to an embodiment of the inventive concept. Referring to FIG. 1, the substrate inspection method 1000 may include operation S1100 for detecting a high-signal to noise ratio (SNR) defect candidate region. An SNR may be defined as a ratio of a gray level of a defect candidate region to a gray level of an external region out of the defect candidate region in a difference image that is a difference between an image of a substrate and a reference image. A high SNR indicates that an SNR in a difference image is greater than 1. Operation S1100 of detecting the high-SNR defect candidate region is described in more detail below with reference to FIGS. 2 to 14.

The substrate inspection method 1000 may further include operation S1200 of detecting a low-SNR defect candidate region. A low SNR indicates that an SNR is less than 1 in a difference image. In an existing substrate inspection method of detecting a defect candidate region from a difference image, it is impossible to detect the defect candidate region when an SNR of the defect candidate region is less than 1 in the difference image. However, according to the inventive concept, a low-SNR defect candidate region of which an SNR is less than 1 in a difference image may also be detected. Operation S1200 of detecting the low-SNR defect candidate region is described in more detail below with reference to FIGS. 15 and 16.

The substrate inspection method 1000 may further include operation S1300 of determining whether there is a defect of interest (DOI) in the high-SNR defect candidate region and the low-SNR defect candidate region, by using an electron microscope. Because an operation of determining whether there is a DOI, by using an electron microscope, takes a considerable time, operation S1300 of determining whether there is a DOI for only some of the detected high-SNR defect candidate regions and low-SNR defect candidate regions, by using an electron microscope, may be performed.

Figure 2:
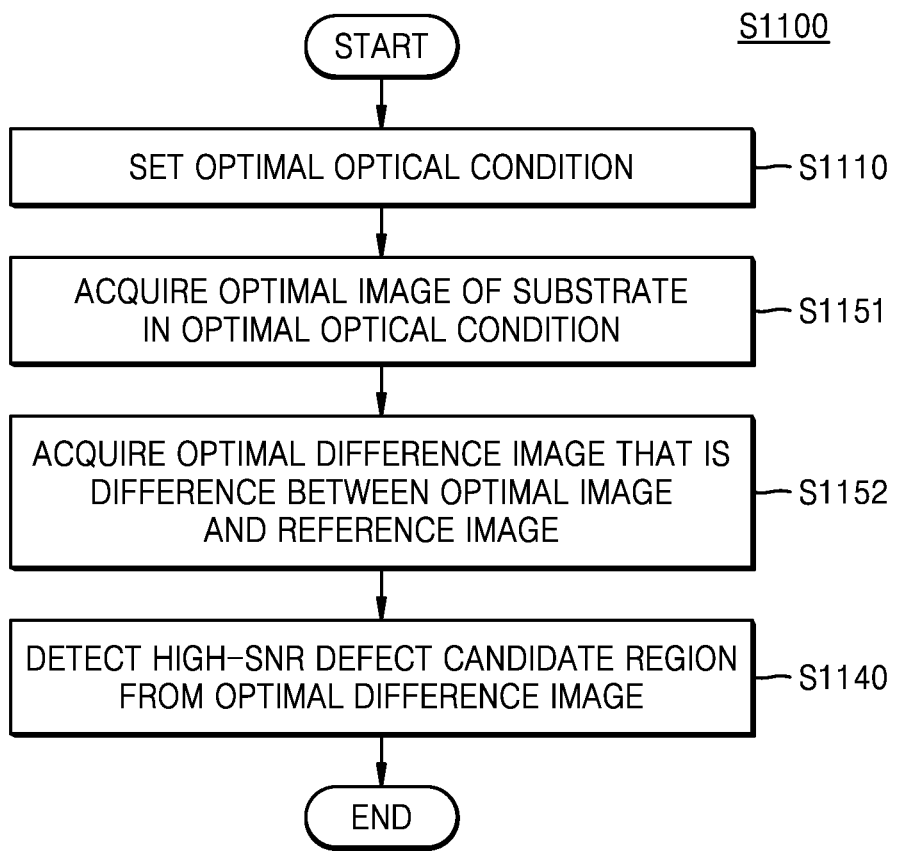
FIG. 2 is a flowchart illustrating an operation of detecting a high-signal to noise ratio (SNR) defect candidate region, according to an embodiment of the inventive concept.

FIG. 2 is a flowchart illustrating operation S1100 of detecting the high-SNR defect candidate region, according to an embodiment of the inventive concept. Referring to FIG. 2, operation S1100 of detecting the high-SNR defect candidate region may include operation S1110 of setting an optimal optical condition. In the specification, an optical condition may include at least one of a wavelength condition, an iris condition, a polarizing condition, and a light intensity condition. The optimal optical condition may be an optical condition in which a DOI is optimally detected. Operation S1110 of setting the optimal optical condition is described in more detail below with reference to FIG. 3.

Operation S1100 of detecting the high-SNR defect candidate region may further include operation S1151 of acquiring an optimal image of a substrate in the optimal optical condition. And, operation S1100 of detecting the high-SNR defect candidate region may further include operation S1152 of acquiring an optimal difference image that is a difference between the optimal image and the reference image. Next, operation S1100 of detecting the high-SNR defect candidate region may further include operation S1140 of detecting the high-SNR defect candidate region from the optimal difference image.

For example, a feature may be extracted from the optimal difference image. The feature may include at least one of texture, brightness, and an SNR. For example, the high-SNR defect candidate region may be detected by determining whether the feature satisfies particular conditions, by using a decision tree.

Figure 3:
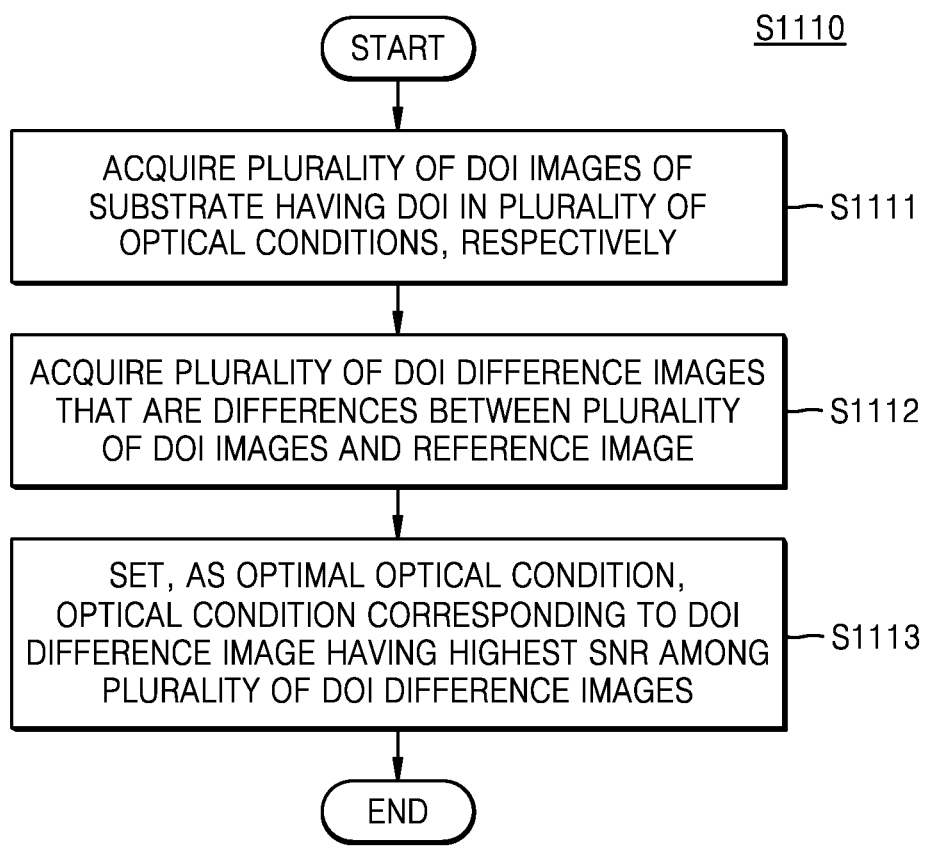
FIG. 3 is a flowchart illustrating an operation of setting an optimal optical condition, according to an embodiment of the inventive concept.

FIG. 3 is a flowchart illustrating operation S1110 of setting the optimal optical condition, according to an embodiment of the inventive concept. Referring to FIG. 3, operation S1110 of setting the optimal optical condition may include operation S1111 of acquiring a plurality of DOI images of the substrate having the DOI in a plurality of optical conditions, respectively. Operation S1110 of setting the optimal optical condition may further include operation S1112 of acquiring a plurality of DOI difference images that are differences between the plurality of DOI images and the reference image. Operation S1110 of setting the optimal optical condition may further include operation S1113 of setting, as the optimal optical condition, an optical condition corresponding to a DOI difference image having the highest SNR among the plurality of DOI difference images. According to operation S1110 of setting the optimal optical condition, an optical condition in which the DOI is detected best may be set as the optimal optical condition.

Figure 5A:
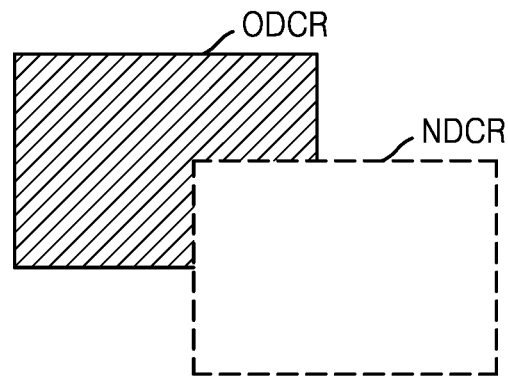
FIGS. 5A and 5B are conceptual diagrams illustrating an operation of detecting a high-SNR defect candidate region, according to an embodiment of the inventive concept.
Figure 5B:
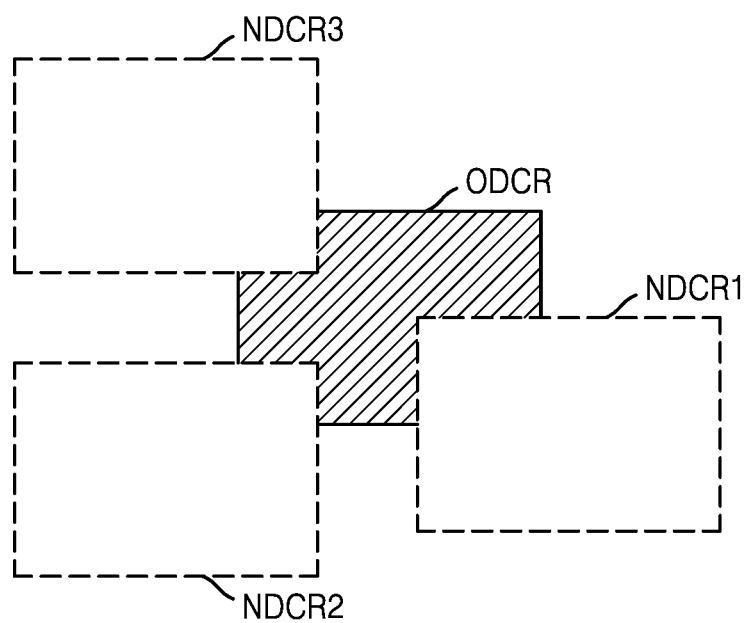

FIG. 4 is a flowchart illustrating operation S1100A of detecting the high-SNR defect candidate region, according to an embodiment of the inventive concept. FIGS. 5A and 5B are conceptual diagrams illustrating operation S1100A of detecting the high-SNR defect candidate region, according to an embodiment of the inventive concept.

Referring to FIGS. 4 and 5A-5B, operation S1100A of detecting the high-SNR defect candidate region may include operation S1110 of setting the optimal optical condition. A description of operation S1110 of setting the optimal optical condition is the same as made with reference to FIGS. 2 and 3.

Operation S1100A of detecting the high-SNR defect candidate region may further include operation S1170 of setting a non-optimal optical condition. The non-optimal optical condition may be an optical condition in which an uninterested defect is detected best, a process distribution is detected best, or a DOI is least likely to be detected. Operation S1170 of setting the non-optimal optical condition may be described in more detail below with reference to FIGS. 8 to 10.

Operation S1100A of detecting the high-SNR defect candidate region may further include operation S1150 of detecting an optimal defect candidate region in the optimal optical condition. Operation S1150 of detecting the optimal defect candidate region in the optimal optical condition may be described in more detail below with reference to FIG. 6.

Operation S1100A of detecting the high-SNR defect candidate region may further include operation S1160 of detecting a non-optimal defect candidate region in the non-optimal optical condition. Operation S1160 of detecting the non-optimal defect candidate region in the non-optimal optical condition may be described in more detail below with reference to FIG. 7. Operation S1100A of detecting the high-SNR defect candidate region may further include operation S1140A of detecting a high-SNR defect candidate region by subtracting the non-optimal defect candidate region from the optimal defect candidate region.

As shown by FIG. 5A, a high-SNR defect candidate region (a hatched portion) may be obtained by subtracting an overlapping portion of a non-optimal defect candidate region NDCR from an optimal defect candidate region ODCR. That is, the high-SNR defect candidate region (the hatched portion) may be a portion of the optimal defect candidate region ODCR, which is not common to the non-optimal defect candidate region NDCR. By excluding the non-optimal defect candidate region NDCR having a high possibility of including an uninterested defect or a process distribution from the optimal defect candidate region ODCR having a high possibility of including a DOI, the uninterested defect or the process distribution may be prevented from being detected as the high-SNR defect candidate region.

As shown in FIG. 5B, a high-SNR defect candidate region (a hatched portion) may be obtained by subtracting a plurality of non-optimal defect candidate regions (e.g., first to third non-optimal defect candidate regions NDCR1 to NDCR3) from the optimal defect candidate region ODCR. The first to third non-optimal defect candidate regions NDCR1 to NDCR3 may be detected using different non-optimal optical conditions, respectively. For example, the first non-optimal defect candidate region NDCR1 may be detected using a first non-optimal optical condition in which an uninterested defect is detected best. The second non-optimal defect candidate region NDCR2 may be detected using a second non-optimal optical condition in which a DOI is least likely to be detected. The third non-optimal defect candidate region NDCR3 may be detected using a third non-optimal optical condition in which a process distribution is detected best. As such, by excluding the first to third non-optimal defect candidate regions NDCR1 to NDCR3 having a high possibility of not including the DOI from the optimal defect candidate region ODCR having a high possibility of including the DOI, the uninterested defect or the process distribution may be further prevented from being detected as the high-SNR defect candidate region.

Figure 6:
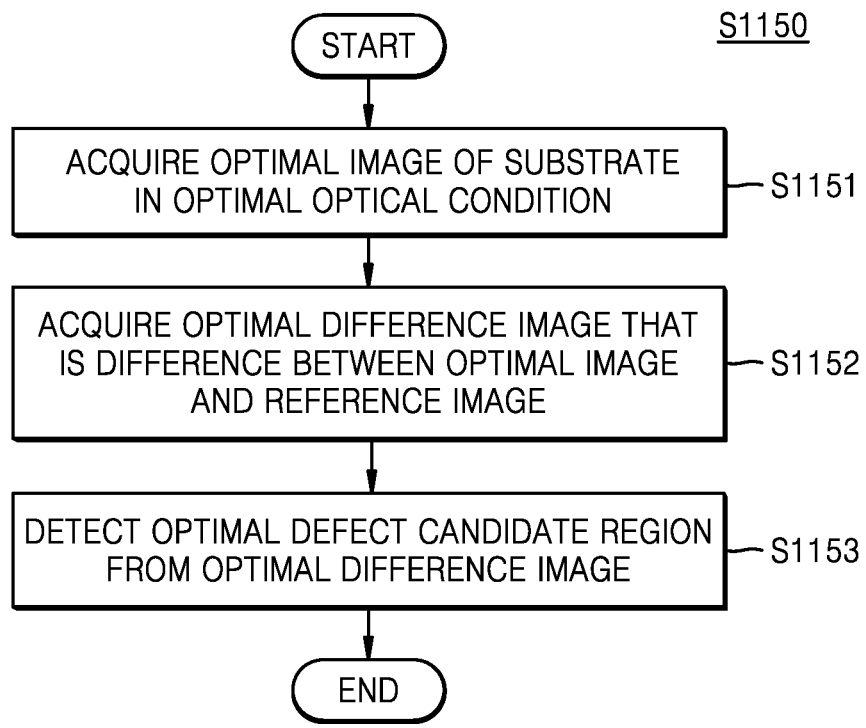
FIG. 6 is a flowchart illustrating an operation of detecting an optimal defect candidate region under an optimal optical condition, according to an embodiment of the inventive concept.

FIG. 6 is a flowchart illustrating operation S1150 of detecting the optimal defect candidate region in the optimal optical condition, according to an embodiment of the inventive concept. Referring to FIG. 6, operation S1150 of detecting the optimal defect candidate region in the optimal optical condition may include operation S1151 of acquiring an optimal image of the substrate in the optimal optical condition. Operation S1150 of detecting the optimal defect candidate region in the optimal optical condition may further include operation S1152 of acquiring an optimal difference image that is a difference between the optimal image and the reference image. Operation S1150 of detecting the optimal defect candidate region in the optimal optical condition may further include operation S1153 of detecting the optimal defect candidate region from the optimal difference image. For example, a feature may be extracted from the optimal difference image. The feature may include at least one of texture, brightness, and an SNR. For example, the optimal defect candidate region may be detected by determining whether the feature satisfies particular conditions, by using a decision tree.

Figure 7:
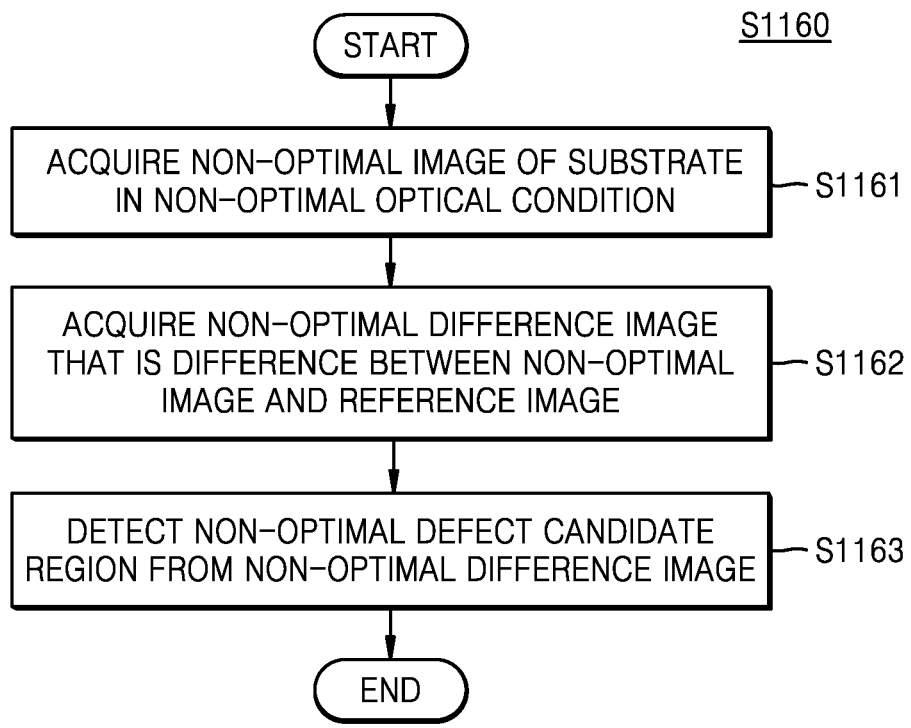
FIG. 7 is a flowchart illustrating an operation of detecting a non-optimal defect candidate region under a non-optimal optical condition, according to an embodiment of the inventive concept.

FIG. 7 is a flowchart illustrating operation S1160 of detecting the non-optimal defect candidate region in the non-optimal optical condition, according to an embodiment of the inventive concept. Referring to FIG. 7, operation S1160 of detecting the non-optimal defect candidate region in the non-optimal optical condition may include operation S1161 of acquiring a non-optimal image of a substrate in the non-optimal optical condition. Operation S1160 of detecting the non-optimal defect candidate region in the non-optimal optical condition may further include operation S1162 of acquiring a non-optimal difference image that is a difference between the non-optimal image and the reference image. Operation S1160 of detecting the non-optimal defect candidate region in the non-optimal optical condition may further include operation S1163 of detecting the non-optimal defect candidate region from the non-optimal difference image. For example, a feature may be extracted from the non-optimal difference image. The feature may include at least one of texture, brightness, and an SNR. For example, the non-optimal defect candidate region may be detected by determining whether the feature satisfies particular conditions, by using a decision tree.

Figure 8:
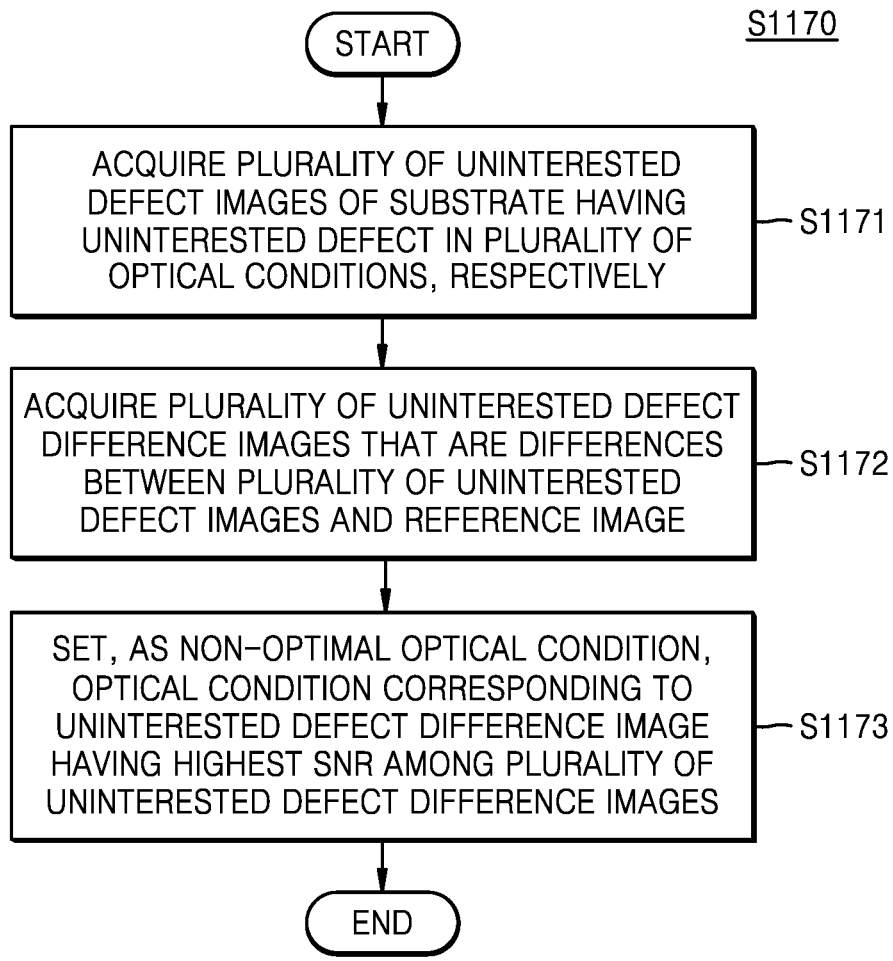
FIG. 8 is a flowchart illustrating an operation of setting a non-optimal optical condition, according to an embodiment of the inventive concept.

FIG. 8 is a flowchart illustrating operation S1170 of setting the non-optimal optical condition, according to an embodiment of the inventive concept. Referring to FIG. 8, operation S1170 of setting the non-optimal optical condition may include operation S1171 of acquiring a plurality of uninterested defect images of the substrate having an uninterested defect under the plurality of optical conditions. Operation S1170 of setting the non-optimal optical condition may further include operation S1172 of acquiring a plurality of uninterested defect difference images that are differences between the plurality of uninterested defect images and the reference image. Operation S1170 of setting the non-optimal optical condition may further include operation S1173 of setting, as the non-optimal optical condition, an optical condition corresponding to an uninterested defect difference image having the highest SNR among the plurality of uninterested defect difference images. By operation S1170 of setting the non-optimal optical condition, an optical condition in which an uninterested defect is detected best may be set as the non-optimal optical condition.

Figure 9:
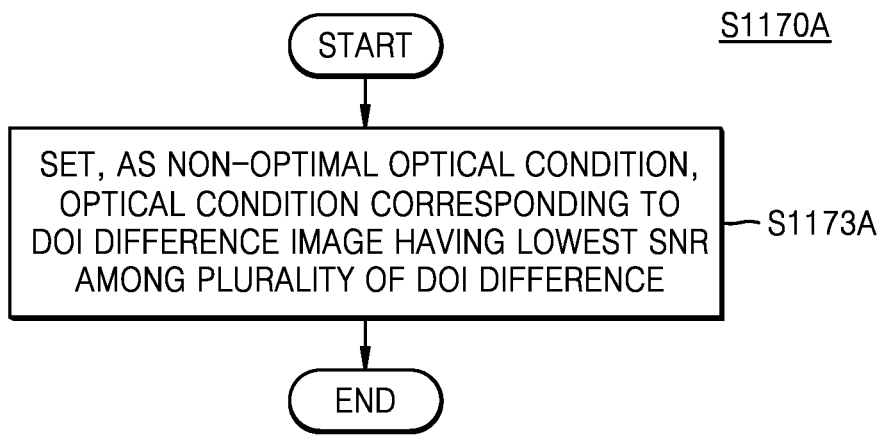
FIG. 9 is a flowchart illustrating an operation of setting a non-optimal optical condition, according to an embodiment of the inventive concept.

FIG. 9 is a flowchart illustrating operation S1170A of setting the non-optimal optical condition, according to an embodiment of the inventive concept. Referring to FIG. 9, operation S1170A of setting the non-optimal optical condition may include operation S1173A of setting, as the non-optimal optical condition, an optical condition corresponding to a DOI difference image having the lowest SNR among the plurality of DOI defect difference images. A process of acquiring the DOI difference image is the same as described hereinabove with reference to FIG. 3. By operation S1170A of setting the non-optimal optical condition, an optical condition in which a DOI is least likely to be detected may be set as the non-optimal optical condition.

Figure 10:
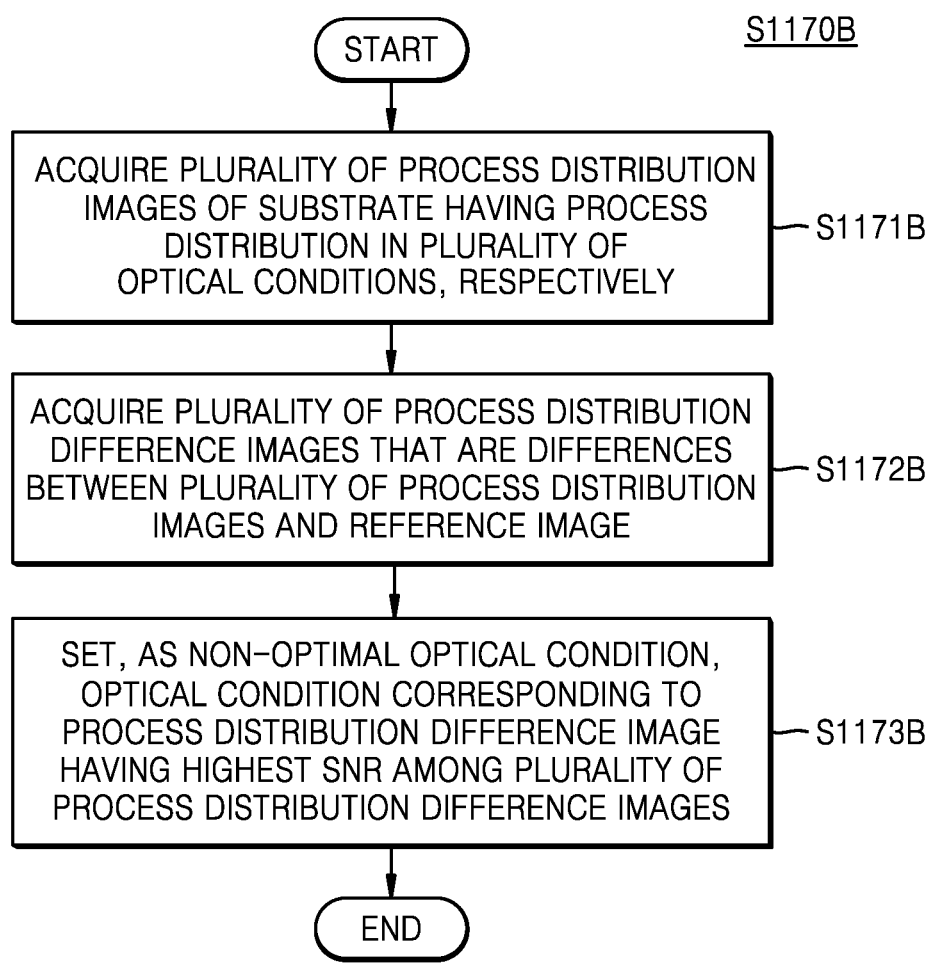
FIG. 10 is a flowchart illustrating an operation of setting a non-optimal optical condition, according to an embodiment of the inventive concept.

FIG. 10 is a flowchart illustrating operation S1170B of setting the non-optimal optical condition, according to an embodiment of the inventive concept. Referring to FIG. 10, operation S1170B of setting the non-optimal optical condition may include operation S1171B of acquiring a plurality of process distribution images of the substrate having a process distribution under the plurality of optical conditions. Operation S1170B of setting the non-optimal optical condition may further include operation S1172B of acquiring a plurality of process distribution difference images that are differences between the plurality of process distribution images and the reference image. Operation S1170B of setting the non-optimal optical condition may further include operation S1173B of setting, as the non-optimal optical condition, an optical condition corresponding to a process distribution difference image having the highest SNR among the plurality of process distribution difference images. By operation S1170B of setting the non-optimal optical condition, an optical condition in which a process distribution is detected best may be set as the non-optimal optical condition.

Figure 11:
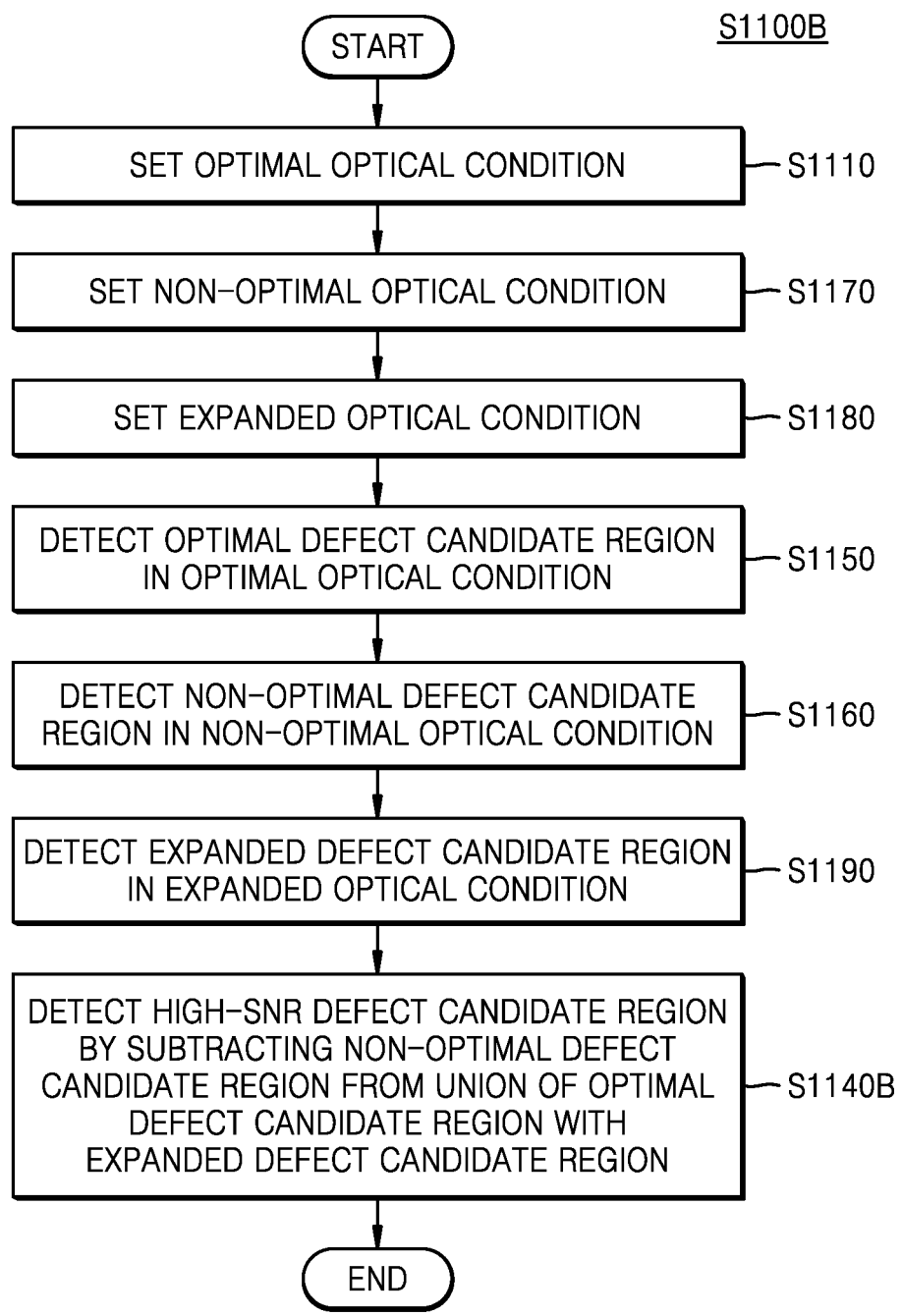
FIG. 11 is a flowchart illustrating an operation of detecting a high-SNR defect candidate region, according to an embodiment of the inventive concept.
Figure 12A:
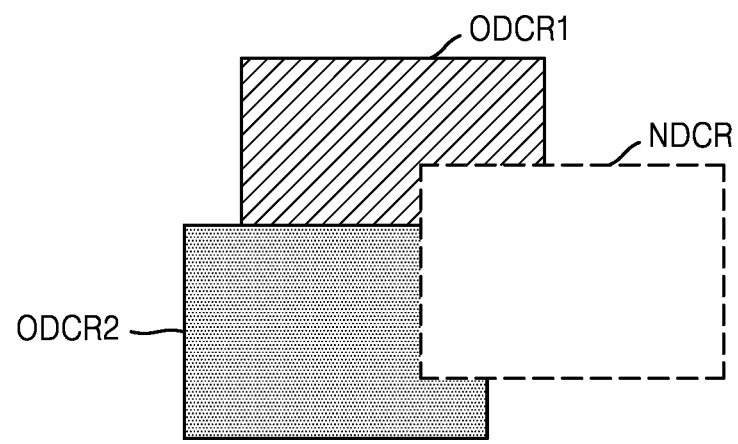
FIGS. 12A and 12B are conceptual diagrams illustrating an operation of detecting a high-SNR defect candidate region, according to an embodiment of the inventive concept.
Figure 12B:
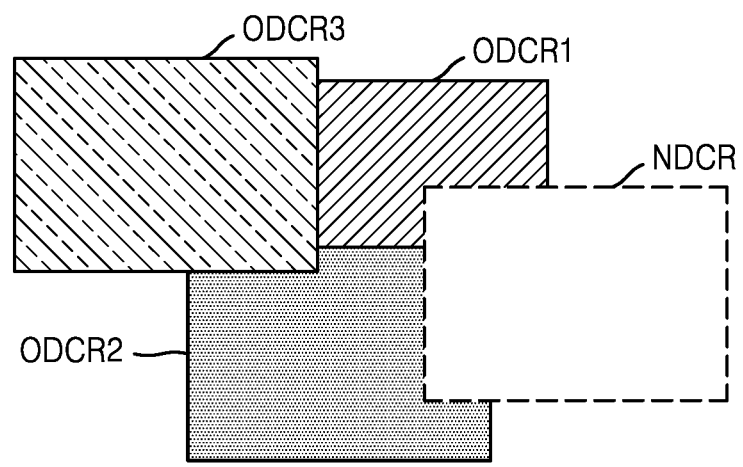

FIG. 11 is a flowchart illustrating operation 1100B of detecting the high-SNR defect candidate region, according to an embodiment of the inventive concept. FIGS. 12A and 12B are conceptual diagrams illustrating an operation of detecting the high-SNR defect candidate region, according to an embodiment of the inventive concept.

Referring to FIG. 11, operation 1100B of detecting the high-SNR defect candidate region may include operation S1110 of setting the optimal optical condition. A description of operation S1110 of setting the optimal optical condition is the same as made hereinabove with reference to FIGS. 2 and 3.

Operation 1100B of detecting the high-SNR defect candidate region may further include operation S1170 of setting the non-optimal optical condition. Operation S1170 of setting the non-optimal optical condition is the same as described hereinabove with reference to FIGS. 8 to 10.

Operation 1100B of detecting the high-SNR defect candidate region may further include operation S1180 of setting an expanded optical condition. The expanded optical condition may be an optical condition in which the DOI is detected as second best. Operation S1180 of setting the expanded optical condition is described in more detail below with reference to FIG. 14.

Operation 1100B of detecting the high-SNR defect candidate region may further include operation S1150 of detecting the optimal defect candidate region in the optimal optical condition. Operation S1150 of detecting the optimal defect candidate region in the optimal optical condition has been described in detail with reference to FIG. 6.

Operation 1100B of detecting the high-SNR defect candidate region may further include operation S1160 of detecting the non-optimal defect candidate region in the non-optimal optical condition. Operation S1160 of detecting the non-optimal defect candidate region in the non-optimal optical condition has been described in detail with reference to FIG. 7.

Operation 1100B of detecting the high-SNR defect candidate region may further include operation S1190 of detecting an expanded defect candidate region in the expanded optical condition. Operation S1190 of detecting the expanded defect candidate region in the expanded optical condition is described in more detail below with reference to FIG. 13.

Operation 1100B of detecting the high-SNR defect candidate region may further include operation S1140B of detecting the high-SNR defect candidate region by subtracting the non-optimal defect candidate region from a union of the optimal defect candidate region with the expanded defect candidate region. As shown in FIG. 12A, a high-SNR defect candidate region (a hatched portion) may be obtained by subtracting the non-optimal defect candidate region NDCR from a union of an optimal defect candidate region ODCR1 with an expanded defect candidate region ODCR2. That is, the high-SNR defect candidate region (the hatched portion) may be a portion of the union of the optimal defect candidate region ODCR1 with the expanded defect candidate region ODCR2, which is not common to the non-optimal defect candidate region NDCR. By additionally using the expanded defect candidate region ODCR2 having a high possibility of including a DOI, a DOI detection probability may increase.

As shown in FIG. 12B, a high-SNR defect candidate region (a hatched portion) may be obtained by subtracting the non-optimal defect candidate region NDCR from a union of the optimal defect candidate region ODCR1 with a plurality of expanded defect candidate regions (e.g., first and second expanded defect candidate regions ODCR2 and ODCR3). The first and second expanded defect candidate regions ODCR2 and ODCR3 may be detected using different expanded optical conditions. For example, the first expanded defect candidate region ODCR2 may be detected using a first expanded optical condition in which a DOI is detected second best. In addition, the second expanded defect candidate region ODCR3 may be detected using a second expanded optical condition in which the DOI is detected third best. By additionally using the plurality of expanded defect candidate regions ODCR2 and ODCR3 having a high possibility of including the DOI, a DOI detection probability may further increase.

Figure 13:
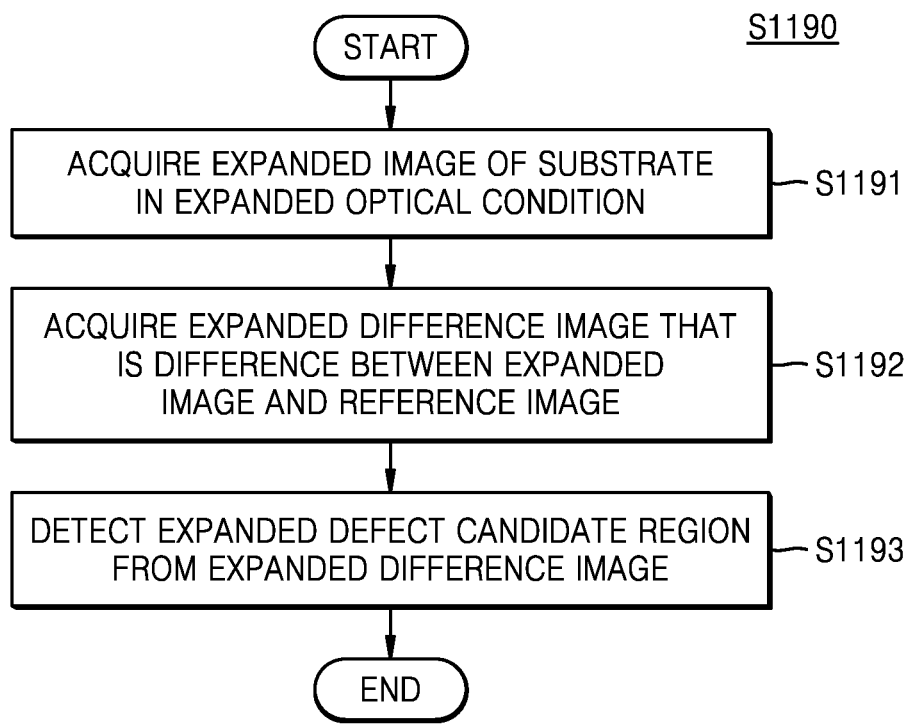
FIG. 13 is a flowchart illustrating an operation of detecting an expanded defect candidate region under an expanded optical condition, according to an embodiment of the inventive concept.

FIG. 13 is a flowchart illustrating operation S1190 of detecting the expanded defect candidate region in the expanded optical condition, according to an embodiment of the inventive concept. Referring to FIG. 13, operation S1190 of detecting the expanded defect candidate region in the expanded optical condition may include operation S1191 of acquiring an expanded image of the substrate in the expanded optical condition. Operation S1190 of detecting the expanded defect candidate region in the expanded optical condition may further include operation S1192 of acquiring an expanded difference image based on a difference between the expanded image and the reference image. Operation S1190 of detecting the expanded defect candidate region in the expanded optical condition may further include operation S1193 of detecting the expanded defect candidate region from the expanded difference image. For example, a feature may be extracted from the expanded difference image. The feature may include at least one of texture, brightness, and an SNR. For example, the expanded defect candidate region may be detected by determining whether the feature satisfies particular conditions, by using a decision tree.

Figure 14:
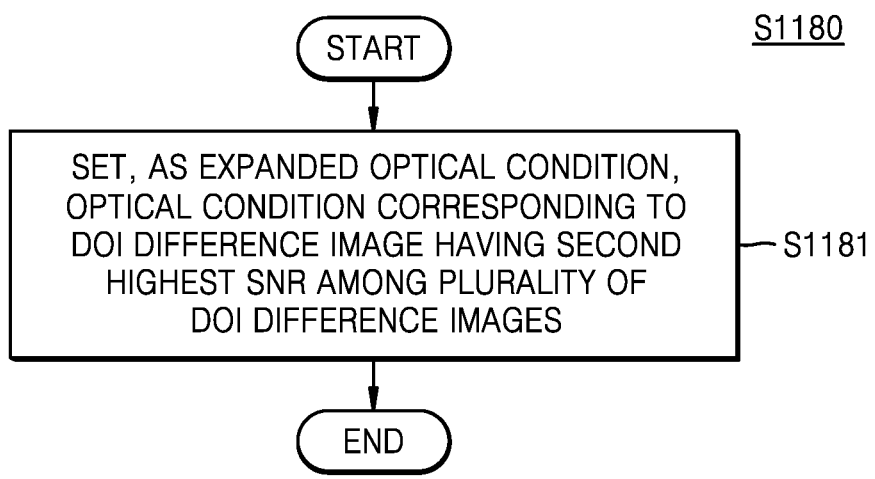
FIG. 14 is a flowchart illustrating an operation of setting an expanded optical condition, according to an embodiment of the inventive concept.

FIG. 14 is a flowchart illustrating operation S1180 of setting the expanded optical condition, according to an embodiment of the inventive concept. Referring to FIG. 14, operation S1180 of setting the expanded optical condition may include operation S1181 of setting, as the expanded optical condition, an optical condition corresponding to a DOI difference image having a second highest SNR among the plurality of DOI difference images. By operation S1180 of setting the expanded optical condition, an optical condition in which the DOI is detected second best may be set as the expanded optical condition.

Figure 15:
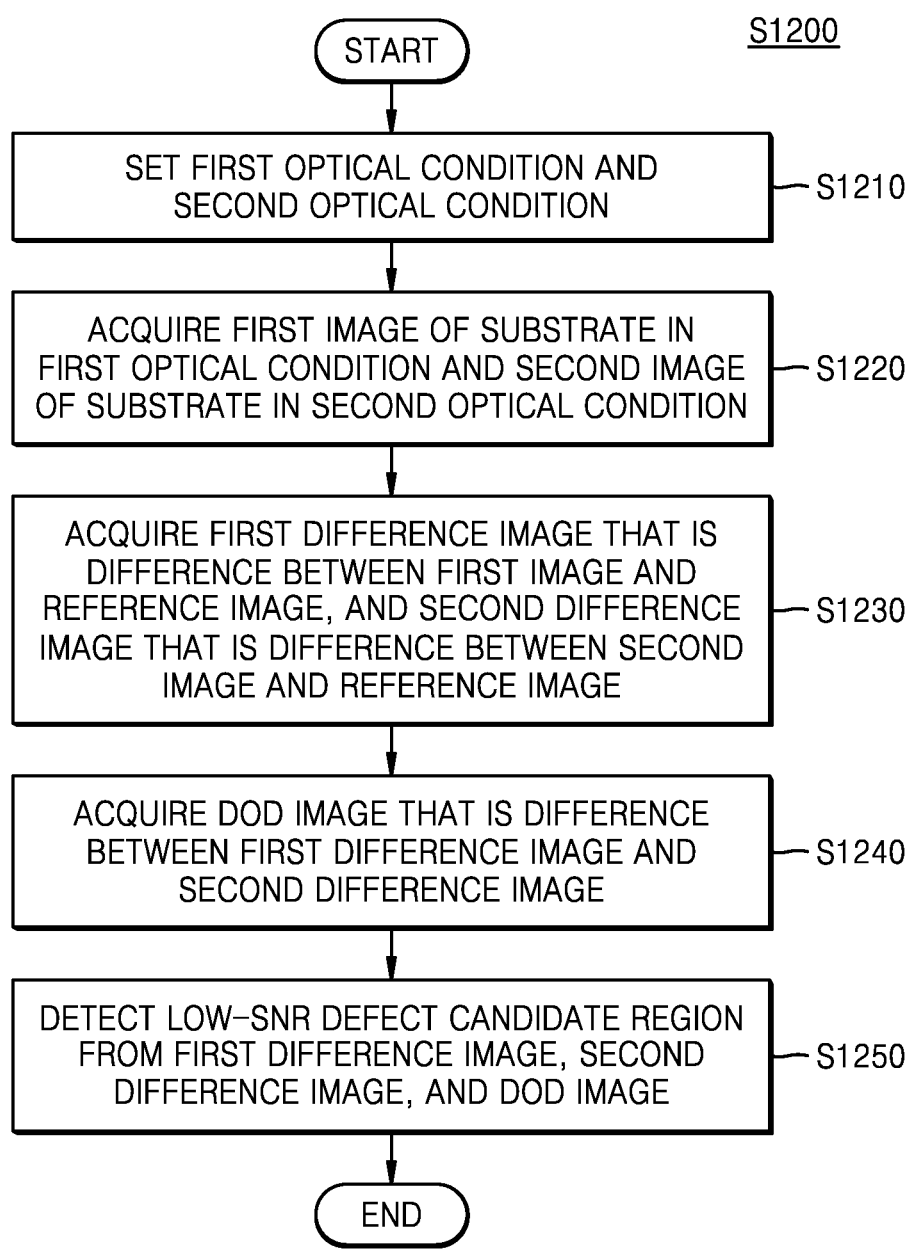
FIG. 15 is a flowchart illustrating an operation of detecting a low-SNR defect candidate region, according to an embodiment of the inventive concept.

FIG. 15 is a flowchart illustrating operation S1200 of detecting the low-SNR defect candidate region, according to an embodiment of the inventive concept. Referring to FIG. 15, operation S1200 of detecting the low-SNR defect candidate region may include operation S1210 of setting a first optical condition and a second optical condition. Operation S1210 of setting the first optical condition and the second optical condition is described in more detail hereinbelow with reference to FIG. 16.

Operation S1200 of detecting the low-SNR defect candidate region may further include operation S1220 of acquiring a first image of the substrate under the first optical condition and a second image of the substrate under the second optical condition.

Operation S1200 of detecting the low-SNR defect candidate region may further include operation S1230 of acquiring a first difference image that is a difference between the first image and the reference image, and a second difference image that is a difference between the second image and the reference image.

Operation S1200 of detecting the low-SNR defect candidate region may further include operation S1240 of acquiring a difference of difference (DOD) image that is a difference between the first difference image and the second difference image.

Operation S1200 of detecting the low-SNR defect candidate region may further include operation S1250 of detecting the low-SNR defect candidate region from the first difference image, the second difference image, and the DOD image. For example, a feature may be extracted from the first difference image, the second difference image, and the DOD image. The feature may include at least one of texture, brightness, and an SNR. For example, the low-SNR defect candidate region may be detected by determining whether the feature satisfies particular conditions, by using a decision tree.

According to the inventive concept, a low-SNR defect candidate region of which an SNR is less than 1 in difference images may also be detected by using the difference images and a DOD image in a plurality of optical conditions. Therefore, a DOI detection performance may be improved.

Figure 16:
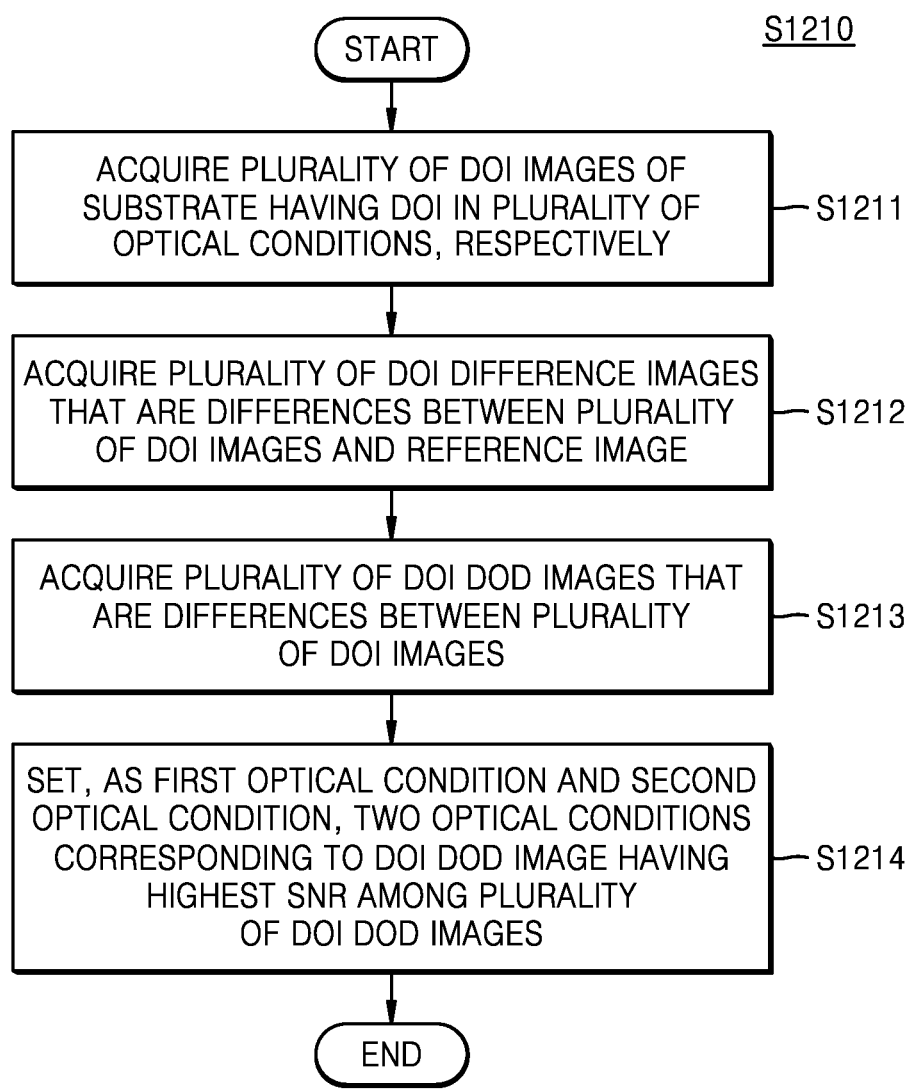
FIG. 16 is a flowchart illustrating an operation of setting a first optical condition and a second optical condition.

FIG. 16 is a flowchart illustrating operation S1210 of setting the first optical condition and the second optical condition.

Referring to FIG. 16, operation S1210 of setting the first optical condition and the second optical condition may include operation S1211 of acquiring a plurality of DOI images of the substrate having the DOI, under the plurality of optical conditions. Operation S1210 of setting the first optical condition and the second optical condition may further include operation S1212 of acquiring a plurality of DOI difference images that are differences between the plurality of DOI images and the reference image. Operation S1210 of setting the first optical condition and the second optical condition may further include operation S1213 of acquiring a plurality of DOI DOD images that are differences between the plurality of DOI difference images. Operation S1210 of setting the first optical condition and the second optical condition may further include operation S1214 of setting, as the first optical condition and the second optical condition, two optical conditions corresponding to a DOI DOD image having the highest SNR among the plurality of DOI DOD images. In some embodiments, an SNR of each of the two DOI difference images corresponding to the first optical condition and the second optical condition may be less than 1.

Figure 17:
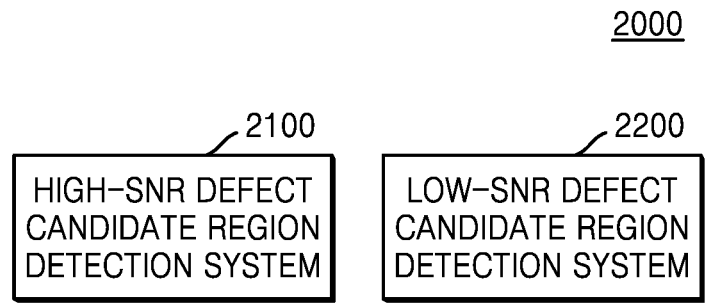
FIG. 17 is a block diagram illustrating a substrate inspection device according to an embodiment of the inventive concept.

FIG. 17 is a block diagram illustrating a substrate inspection device 2000 according to an embodiment of the inventive concept. Referring to FIG. 17, the substrate inspection device 2000 may include a high-SNR defect candidate region detection system 2100. The high-SNR defect candidate region detection system 2100 may detect a high-SNR defect candidate region. The high-SNR defect candidate region detection system 2100 is described in more detail below with reference to FIGS. 18 to 28.

The substrate inspection device 2000 may further include a low-SNR defect candidate region detection system 2200. According to the inventive concept, a low-SNR defect candidate region of which an SNR is less than 1 in a difference image may also be detected. The low-SNR defect candidate region detection system 2200 is described in more detail below with reference to FIGS. 29 and 30.

Although not shown, the substrate inspection device 2000 may further include an electron microscope inspection module configured to determine whether there is a DOI in the high-SNR defect candidate region and the low-SNR defect candidate region, by using an electron microscope. Because an operation of determining whether there is a DOI using an electron microscope takes a considerable time, the electron microscope inspection module may determine whether there is the DOI for only some of detected high-SNR defect candidate regions and low-SNR defect candidate regions.

Figure 18:
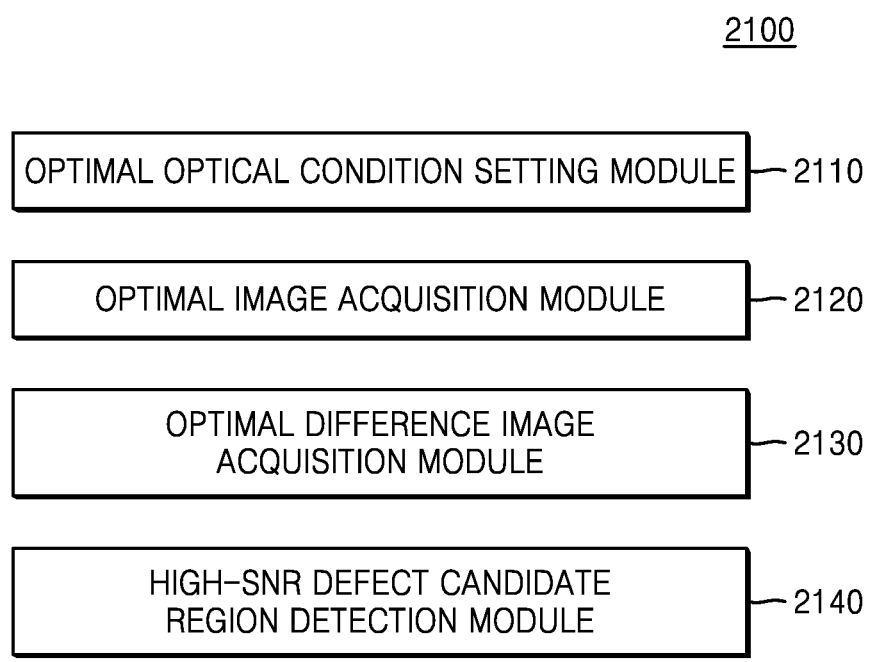
FIG. 18 is a block diagram illustrating a high-SNR defect candidate region detection system according to an embodiment of the inventive concept.

FIG. 18 is a block diagram illustrating the high-SNR defect candidate region detection system 2100 according to an embodiment of the inventive concept. Referring to FIG. 18, the high-SNR defect candidate region detection system 2100 may include an optimal optical condition setting module 2110. The optimal optical condition setting module 2110 may set an optimal optical condition. The optimal optical condition setting module 2110 is described in more detail below with reference to FIG. 19.

The high-SNR defect candidate region detection system 2100 may further include an optimal image acquisition module 2120. The optimal image acquisition module 2151 may acquire an optimal image of a substrate under the optimal optical condition. The high-SNR defect candidate region detection system 2100 may further include an optimal difference image acquisition module 2130. The optimal difference image acquisition module 2152 may acquire an optimal difference image that is a difference between the optimal image and a reference image.

The high-SNR defect candidate region detection system 2100 may further include a high-SNR defect candidate region detection module 2140. The high-SNR defect candidate region detection module 2140 may detect the high-SNR defect candidate region from the optimal difference image. For example, a feature may be extracted from the optimal difference image. The feature may include at least one of texture, brightness, and an SNR. For example, the high-SNR defect candidate region may be detected by determining whether the feature satisfies particular conditions, by using a decision tree.

Figure 19:
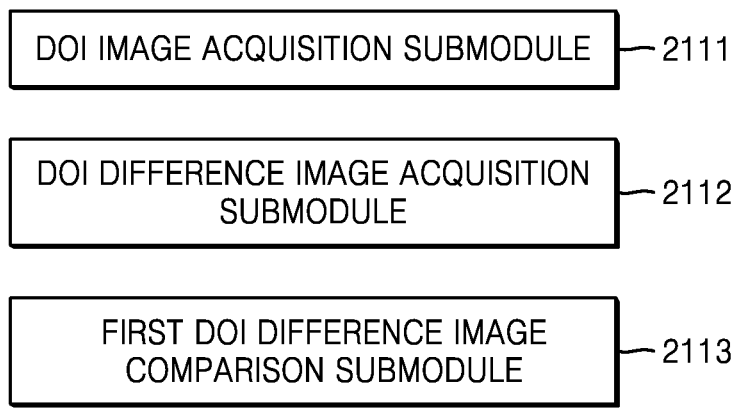
FIG. 19 is a block diagram illustrating an optimal optical condition setting module according to an embodiment of the inventive concept.

FIG. 19 is a block diagram illustrating the optimal optical condition setting module 2110 according to an embodiment of the inventive concept. Referring to FIG. 19, the optimal optical condition setting module 2110 may include a DOI image acquisition submodule 2111. The DOI image acquisition submodule 2111 may acquire a plurality of DOI images of the substrate having a DOI under a plurality of optical conditions, respectively.

The optimal optical condition setting module 2110 may further include a DOI difference image acquisition submodule 2112. The DOI difference image acquisition submodule 2112 may acquire a plurality of DOI difference images that are differences between the plurality of DOI images and the reference image. The optimal optical condition setting module 2110 may further include a first DOI difference image comparison submodule 2113. The first DOI difference image comparison submodule 2113 may set, as the optimal optical condition, an optical condition corresponding to a DOI difference image having the highest SNR among the plurality of DOI difference images. According to the optimal optical condition setting module 2110, an optical condition in which the DOI is detected best may be set as the optimal optical condition.

Figure 20:
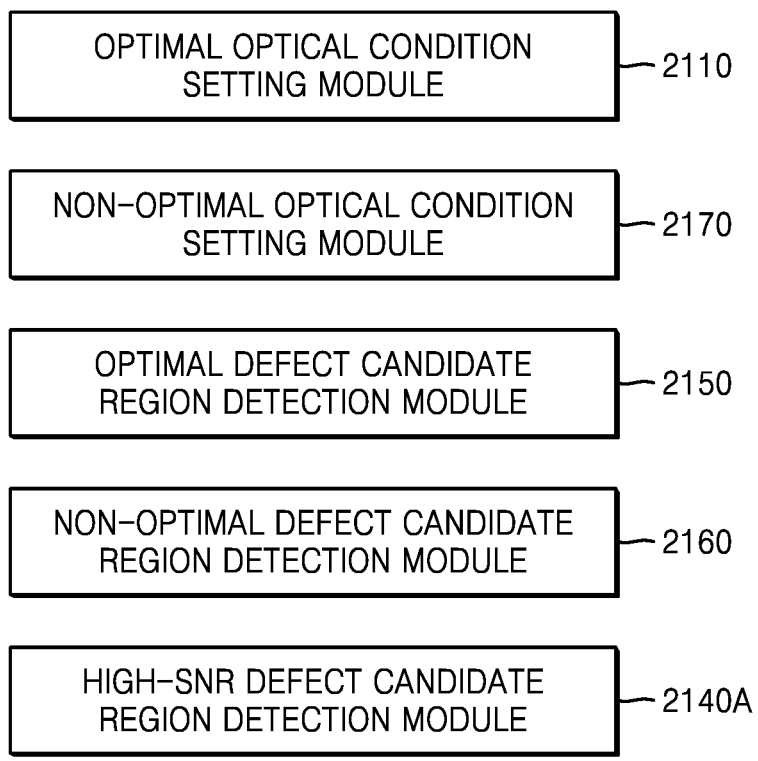
FIG. 20 is a block diagram illustrating a high-SNR defect candidate region detection system according to an embodiment of the inventive concept.

FIG. 20 is a block diagram illustrating a high-SNR defect candidate region detection system 2100A according to an embodiment of the inventive concept. Referring to FIG. 20, the high-SNR defect candidate region detection system 2100A may include the optimal optical condition setting module 2110. The optimal optical condition setting module 2110 may set the optimal optical condition. A description of the optimal optical condition setting module 2110 is the same as made with reference to FIG. 19.

The high-SNR defect candidate region detection system 2100A may further include a non-optimal optical condition setting module 2170. The non-optimal optical condition setting module 2170 may set a non-optimal optical condition. The non-optimal optical condition setting module 2170 is described in more detail below with reference to FIGS. 23 to 25.

The high-SNR defect candidate region detection system 2100A may further include an optimal defect candidate region detection module 2150. The optimal defect candidate region detection module 2150 may detect an optimal defect candidate region under the optimal optical condition. The optimal defect candidate region detection module 2150 is described in more detail below with reference to FIG. 21.

The high-SNR defect candidate region detection system 2100A may further include a non-optimal defect candidate region detection module 2160. The non-optimal defect candidate region detection module 2160 may detect a non-optimal defect candidate region under the non-optimal optical condition. The non-optimal defect candidate region detection module 2160 is described in more detail below with reference to FIG. 22.

The high-SNR defect candidate region detection system 2100A may further include a high-SNR defect candidate region detection module 2140A. The high-SNR defect candidate region detection module 2140A may detect the high-SNR defect candidate region by subtracting the non-optimal defect candidate region from the optimal defect candidate region.

As shown in FIG. 5A, a high-SNR defect candidate region (a hatched portion) may be obtained by subtracting the non-optimal defect candidate region NDCR from the optimal defect candidate region ODCR. That is, the high-SNR defect candidate region (the hatched portion) may be a portion of the optimal defect candidate region ODCR, which is not common to the non-optimal defect candidate region NDCR. By excluding the non-optimal defect candidate region NDCR having a high possibility of including an uninterested defect or a process distribution from the optimal defect candidate region ODCR having a high possibility of including a DOI, the uninterested defect or the process distribution may be prevented from being detected as the high-SNR defect candidate region.

As shown in FIG. 5B, a high-SNR defect candidate region (a hatched portion) may be obtained by subtracting a plurality of non-optimal defect candidate regions, e.g., the first to third non-optimal defect candidate regions NDCR1 to NDCR3, from the optimal defect candidate region ODCR. The first to third non-optimal defect candidate regions NDCR1 to NDCR3 may be detected using different non-optimal optical conditions, respectively. For example, the first non-optimal defect candidate region NDCR1 may be detected under a first non-optimal optical condition in which an uninterested defect is detected best. The second non-optimal defect candidate region NDCR2 may be detected under a second non-optimal optical condition in which a DOI is least likely to be detected. The third non-optimal defect candidate region NDCR3 may be detected under a third non-optimal optical condition in which a process distribution is detected best. As such, by excluding first to third non-optimal defect candidate regions NDCR1 to NDCR3 having a high possibility of not including the DOI from the optimal defect candidate region ODCR having a high possibility of including the DOI, the uninterested defect or the process distribution may be further prevented from being detected as the high-SNR defect candidate region.

Figure 21:
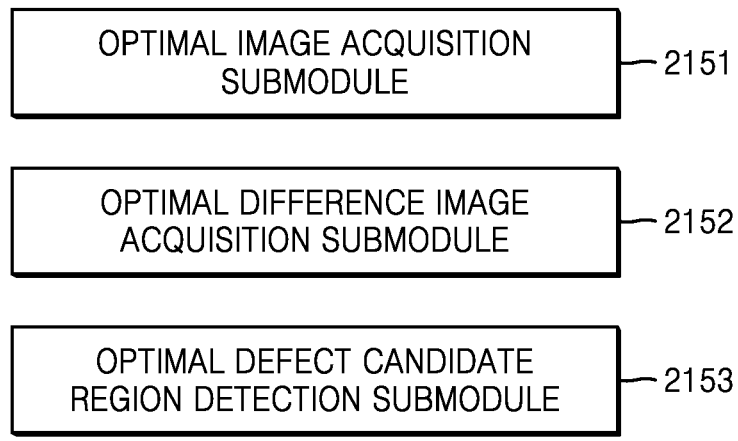
FIG. 21 is a block diagram illustrating an optimal defect candidate region detection module according to an embodiment of the inventive concept.

FIG. 21 is a block diagram illustrating the optimal defect candidate region detection module 2150 according to an embodiment of the inventive concept. Referring to FIG. 21, the optimal defect candidate region detection module 2150 may include an optimal image acquisition submodule 2151. The optimal image acquisition submodule 2151 may acquire an optimal image of the substrate under the optimal optical condition.

The optimal defect candidate region detection module 2150 may further include an optimal difference image acquisition submodule 2152. The optimal difference image acquisition module 2152 may acquire an optimal difference image that is a difference between the optimal image and the reference image.

The optimal defect candidate region detection module 2150 may further include an optimal defect candidate region detection submodule 2153. The optimal defect candidate region detection submodule 2153 may detect an optimal defect candidate region from the optimal difference image. For example, a feature may be extracted from the optimal difference image. The feature may include at least one of texture, brightness, and an SNR. For example, the optimal defect candidate region may be detected by determining whether the feature satisfies particular conditions, by using a decision tree.

Figure 22:
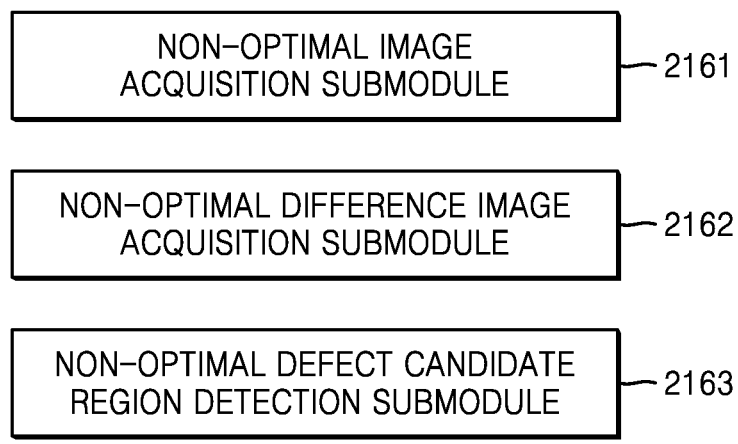
FIG. 22 is a block diagram illustrating a non-optimal defect candidate region detection module according to an embodiment of the inventive concept.

FIG. 22 is a block diagram illustrating the non-optimal defect candidate region detection module 2160 according to an embodiment of the inventive concept. Referring to FIG. 22, the non-optimal defect candidate region detection module 2160 may include a non-optimal image acquisition module 2161. The non-optimal image acquisition module 2161 may acquire a non-optimal image of the substrate under the non-optimal optical condition.

The non-optimal defect candidate region detection module 2160 may further include a non-optimal difference image acquisition module 2162. The non-optimal difference image acquisition module 2162 may acquire a non-optimal difference image that is a difference between the non-optimal image and the reference image.

The non-optimal defect candidate region detection module 2160 may further include a non-optimal defect candidate region detection module 2163. The non-optimal defect candidate region detection module 2163 may detect the non-optimal defect candidate region from the non-optimal difference image. For example, a feature may be extracted from the non-optimal difference image. The feature may include at least one of texture, brightness, and an SNR. For example, the non-optimal defect candidate region may be detected by determining whether the feature satisfies particular conditions, by using a decision tree.

Figure 23:
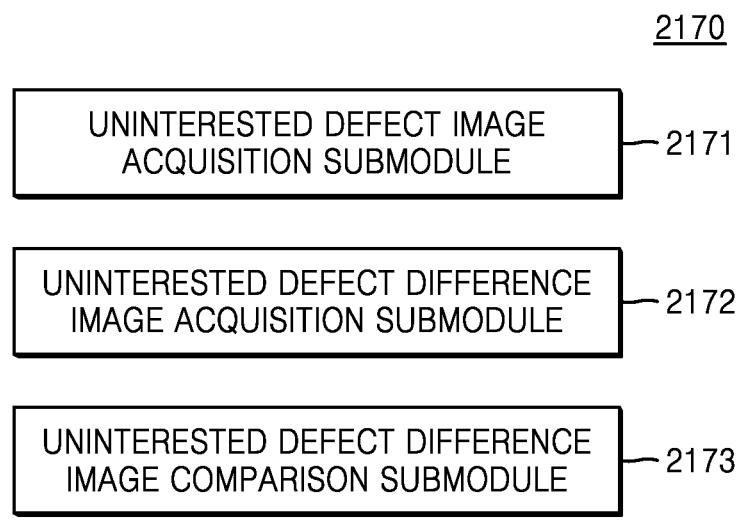
FIG. 23 is a block diagram illustrating a non-optimal optical condition setting module according to an embodiment of the inventive concept.

FIG. 23 is a block diagram illustrating the non-optimal optical condition setting module 2170 according to an embodiment of the inventive concept. Referring to FIG. 23, the non-optimal optical condition setting module 2170 may include an uninterested defect image acquisition submodule 2171. The uninterested defect image acquisition submodule 2171 may acquire a plurality of uninterested defect images of the substrate having an uninterested defect under the plurality of optical conditions.

The non-optimal optical condition setting module 2170 may further include an uninterested defect difference image acquisition submodule 2172. The uninterested defect difference image acquisition submodule 2172 may acquire a plurality of uninterested defect difference images that are differences between the plurality of uninterested defect images and the reference image.

The non-optimal optical condition setting module 2170 may further include an uninterested defect difference image comparison submodule 2173. The uninterested defect difference image comparison submodule 2173 may set, as the non-optimal optical condition, an optical condition corresponding to an uninterested defect difference image having the highest SNR among the plurality of uninterested defect difference images. By the non-optimal optical condition setting module 2170, an optical condition in which an uninterested defect is detected best may be set as the non-optimal optical condition.

Figure 24:
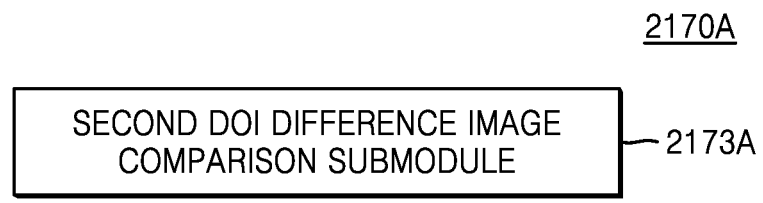
FIG. 24 is a block diagram illustrating a non-optimal optical condition setting module according to an embodiment of the inventive concept.

FIG. 24 is a block diagram illustrating a non-optimal optical condition setting module 2170A according to an embodiment of the inventive concept. Referring to FIG. 24, the non-optimal optical condition setting module 2170A may include a second DOI difference image comparison submodule 2173A. The second DOI difference image comparison submodule 2173A may set, as the non-optimal optical condition, an optical condition corresponding to a DOI difference image having the lowest SNR among a plurality of DOI defect difference images. A process of acquiring a DOI difference image is the same as described with reference to FIG. 19. By the non-optimal optical condition setting module 2170A, an optical condition in which the DOI is least likely to be detected may be set as the non-optimal optical condition.

FIG. 25 is a block diagram illustrating a non-optimal optical condition setting module 2170B according to an embodiment of the inventive concept. Referring to FIG. 25, the non-optimal optical condition setting module 2170B may include a process distribution image acquisition submodule 2171B. The process distribution image acquisition submodule 2171B may acquire a plurality of process distribution images of the substrate having a process distribution, under the plurality of optical conditions.

The non-optimal optical condition setting module 2170B may further include a process distribution difference image acquisition submodule 2172B. The process distribution difference image acquisition submodule 2172B may acquire a plurality of process distribution difference images that are differences between the plurality of process distribution images and the reference image.

The non-optimal optical condition setting module 2170B may further include a process distribution defect difference image comparison submodule 2173B. The process distribution defect difference image comparison submodule 2173B may set, as the non-optimal optical condition, an optical condition corresponding to a process distribution difference image having the highest SNR among the plurality of process distribution difference images. By the non-optimal optical condition setting module 2170B, an optical condition in which a process distribution is detected best may be set as the non-optimal optical condition.

Figure 26:
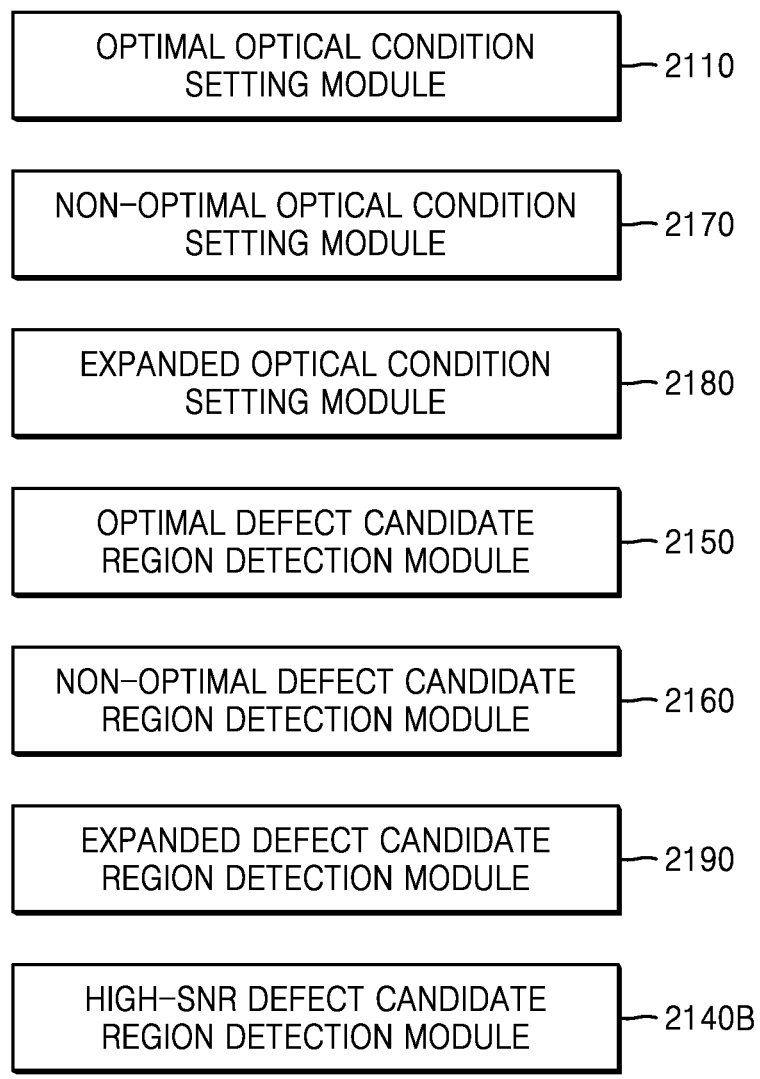
FIG. 26 is a block diagram illustrating a high-SNR defect candidate region detection system according to an embodiment of the inventive concept.

FIG. 26 is a block diagram illustrating a high-SNR defect candidate region detection system 2100B according to an embodiment of the inventive concept. Referring to FIG. 26, the high-SNR defect candidate region detection system 2100B may include the optimal optical condition setting module 2110. The optimal optical condition setting module 2110 may set the optimal optical condition. A description of the optimal optical condition setting module 2110 is the same as made with reference to FIG. 19.

The high-SNR defect candidate region detection system 2100B may further include the non-optimal optical condition setting module 2170. The non-optimal optical condition setting module 2170 may set the non-optimal optical condition. The non-optimal optical condition setting module 2170 is the same as described with reference to FIGS. 23 to 25.

The high-SNR defect candidate region detection system 2100B may further include an expanded optical condition setting module 2180. The expanded optical condition setting module 2180 may set an expanded optical condition. The expanded optical condition setting module 2180 is described in more detail hereinbelow with reference to FIG. 28.

The high-SNR defect candidate region detection system 2100B may further include the optimal defect candidate region detection module 2150. The optimal defect candidate region detection module 2150 may detect the optimal defect candidate region in the optimal optical condition. The optimal defect candidate region detection module 2150 has been described in detail with reference to FIG. 21.

The high-SNR defect candidate region detection system 2100B may further include the non-optimal defect candidate region detection module 2160. The non-optimal defect candidate region detection module 2160 may detect the non-optimal defect candidate region in the non-optimal optical condition. The non-optimal defect candidate region detection module 2160 has been described in detail with reference to FIG. 22.

The high-SNR defect candidate region detection system 2100B may further include an expanded defect candidate region detection module 2190. The expanded defect candidate region detection module 2190 may detect an expanded defect candidate region in the expanded optical condition. The expanded defect candidate region detection module 2190 is described in more detail below with reference to FIG. 27.

The high-SNR defect candidate region detection system 2100B may further include a high-SNR defect candidate region detection module 2140B. The high-SNR defect candidate region detection module 2140B may detect the high-SNR defect candidate region by subtracting the non-optimal defect candidate region from a union of the optimal defect candidate region with the expanded defect candidate region.

As shown in FIG. 12A, a high-SNR defect candidate region (a hatched portion) may be obtained by subtracting the non-optimal defect candidate region NDCR from a union of the optimal defect candidate region ODCR1 with the expanded defect candidate region ODCR2. That is, the high-SNR defect candidate region (the hatched portion) may be a portion of the union of the optimal defect candidate region ODCR1 with the expanded defect candidate region ODCR2, which is not common to the non-optimal defect candidate region NDCR. By additionally using the expanded defect candidate region ODCR2 having a high possibility of including a DOI, a probability/likelihood of DOI detection may increase.

As shown in FIG. 12B, a high-SNR defect candidate region (a hatched portion) may be obtained by subtracting the non-optimal defect candidate region NDCR from a union of the optimal defect candidate region ODCR1 with a plurality of expanded defect candidate regions, e.g., the first and second expanded defect candidate regions ODCR2 and ODCR3. The first and second expanded defect candidate regions ODCR2 and ODCR3 may be detected using different expanded optical conditions. For example, the first expanded defect candidate region ODCR2 may be detected using a first expanded optical condition in which a DOI is detected second best. In addition, the second expanded defect candidate region ODCR3 may be detected using a second expanded optical condition in which the DOI is detected third best. By additionally using the plurality of expanded defect candidate regions ODCR2 and ODCR3 having a high possibility of including the DOI, a DOI detection probability may further increase.

Figure 27:
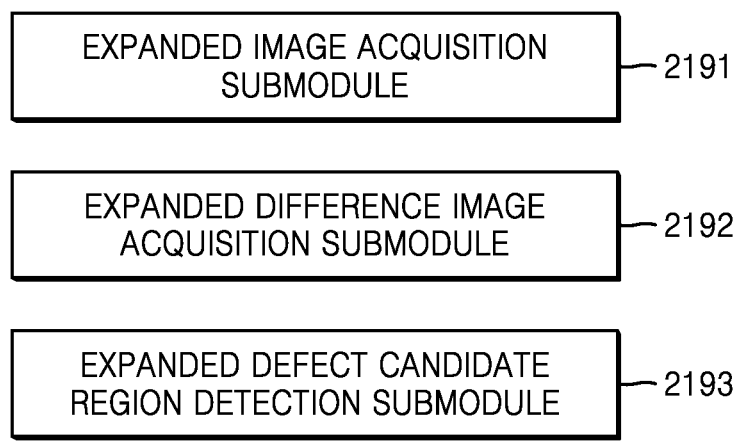
FIG. 27 is a block diagram illustrating an expanded defect candidate region detection module according to an embodiment of the inventive concept.

FIG. 27 is a block diagram illustrating the expanded defect candidate region detection module 2190 according to an embodiment of the inventive concept. Referring to FIG. 27, the expanded defect candidate region detection module 2190 may include an expanded image acquisition submodule 2191. The expanded image acquisition submodule 2191 may acquire an expanded image of the substrate in the expanded optical condition.

The expanded defect candidate region detection module 2190 may further include an expanded difference image acquisition submodule 2192. The expanded difference image acquisition submodule 2192 may acquire an expanded difference image that is a difference between the expanded image and the reference image.

The expanded defect candidate region detection module 2190 may further include an expanded defect candidate region detection submodule 2193. The expanded defect candidate region detection submodule 2193 may detect the expanded defect candidate region from the expanded difference image. For example, a feature may be extracted from the expanded difference image. The feature may include at least one of texture, brightness, and an SNR. For example, the expanded defect candidate region may be detected by determining whether the feature satisfies particular conditions, by using a decision tree.

Figure 28:
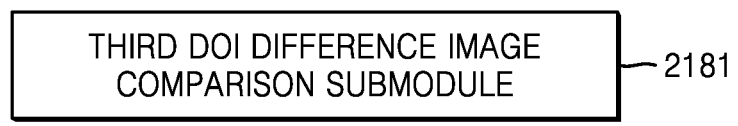
FIG. 28 is a block diagram illustrating an expanded optical condition setting module according to an embodiment of the inventive concept.

FIG. 28 is a block diagram illustrating the expanded optical condition setting module 2180 according to an embodiment of the inventive concept. Referring to FIG. 28, the expanded optical condition setting module 2180 may include a third DOI difference image comparison submodule 2181. The third DOI difference image comparison submodule 2181 may set, as the expanded optical condition, an optical condition corresponding to a DOI difference image having a second highest SNR among the plurality of DOI difference images. By the expanded optical condition setting module 2180, an optical condition in which the DOI is detected second best may be set as the expanded optical condition.

Figure 29:
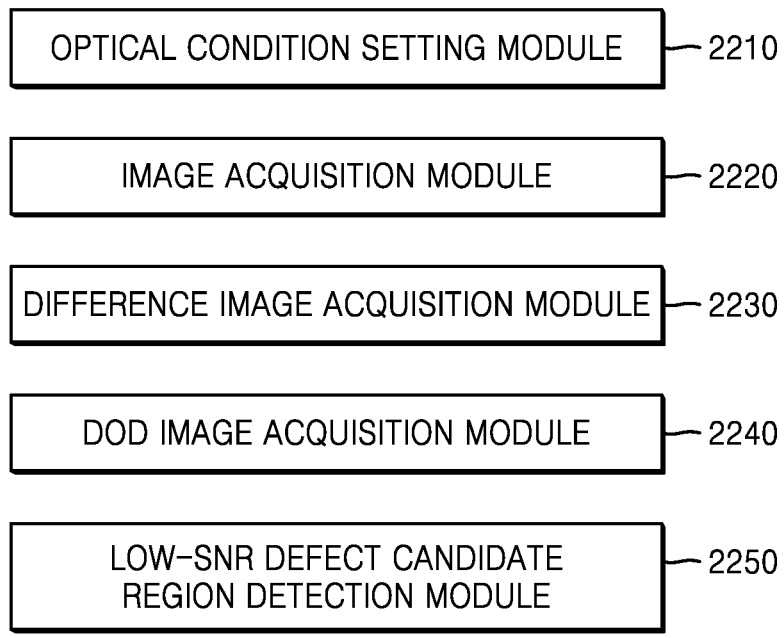
FIG. 29 is a block diagram illustrating a low-SNR defect candidate region detection system, according to an embodiment of the inventive concept.

FIG. 29 is a block diagram illustrating the low-SNR defect candidate region detection system 2200 according to an embodiment of the inventive concept. Referring to FIG. 29, the low-SNR defect candidate region detection system 2200 may include an optical condition setting module 2210. The optical condition setting module 2210 may set a first optical condition and a second optical condition. The optical condition setting module 2210 is described in more detail below with reference to FIG. 30.

The low-SNR defect candidate region detection system 2200 may further include an image acquisition module 2220. The image acquisition module 2220 may acquire a first image of the substrate under the first optical condition and a second image of the substrate under the second optical condition. The low-SNR defect candidate region detection system 2200 may further include a difference image acquisition module 2230. The difference image acquisition module 2230 may acquire a first difference image that is a difference between the first image and the reference image, and a second difference image that is a difference between the second image and the reference image.

The low-SNR defect candidate region detection system 2200 may further include a DOD image acquisition module 2240. The DOD image acquisition module 2240 may acquire a DOD image that is a difference between the first difference image and the second difference image. The low-SNR defect candidate region detection system 2200 may further include a low-SNR defect candidate region detection module 2250. The low-SNR defect candidate region detection module 2250 may detect a low-SNR defect candidate region from the first difference image, the second difference image, and the DOD image. For example, a feature may be extracted from the first difference image, the second difference image, and the DOD image. The feature may include at least one of texture, brightness, and an SNR. For example, the low-SNR defect candidate region may be detected by determining whether the feature satisfies particular conditions, by using a decision tree.

According to the inventive concept, a low-SNR defect candidate region of which an SNR is less than 1 in difference images may also be detected by using the difference images and a DOD image in a plurality of optical conditions. Therefore, a DOI detection performance may be improved.

Figure 30:
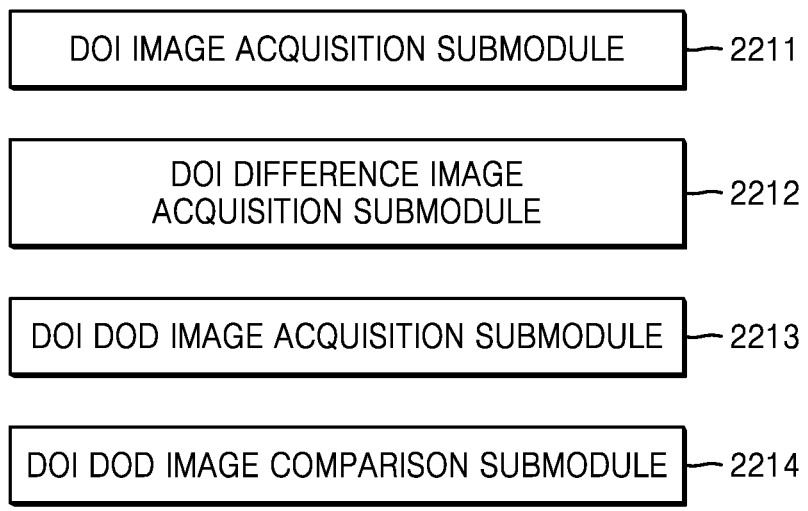
FIG. 30 is a block diagram illustrating an optical condition setting module according to an embodiment of the inventive concept.

FIG. 30 is a block diagram illustrating the optical condition setting module 2210 according to an embodiment of the inventive concept. Referring to FIG. 30, the optical condition setting module 2210 may include a DOI image acquisition submodule 2211. The DOI image acquisition submodule 2211 may acquire a plurality of DOI images of the substrate having the DOI, under the plurality of optical conditions.

The optical condition setting module 2210 may further include a DOI difference image acquisition submodule 2212. The DOI difference image acquisition submodule 2212 may acquire a plurality of DOI difference images that are differences between the plurality of DOI images and the reference image. The optical condition setting module 2210 may further include a DOI DOD image acquisition submodule 2213. The DOI DOD image acquisition submodule 2213 may acquire a plurality of DOI DOD images that are differences between the plurality of DOI difference images.

The optical condition setting module 2210 may further include a DOI DOD image comparison submodule 2214. The DOI DOD image comparison submodule 2214 may set, as the first optical condition and the second optical condition, two optical conditions corresponding to a DOI DOD image having the highest SNR among the plurality of DOI DOD images. In some embodiments, an SNR of each of the two DOI difference images corresponding to the first optical condition and the second optical condition may be less than 1.

Figure 31:
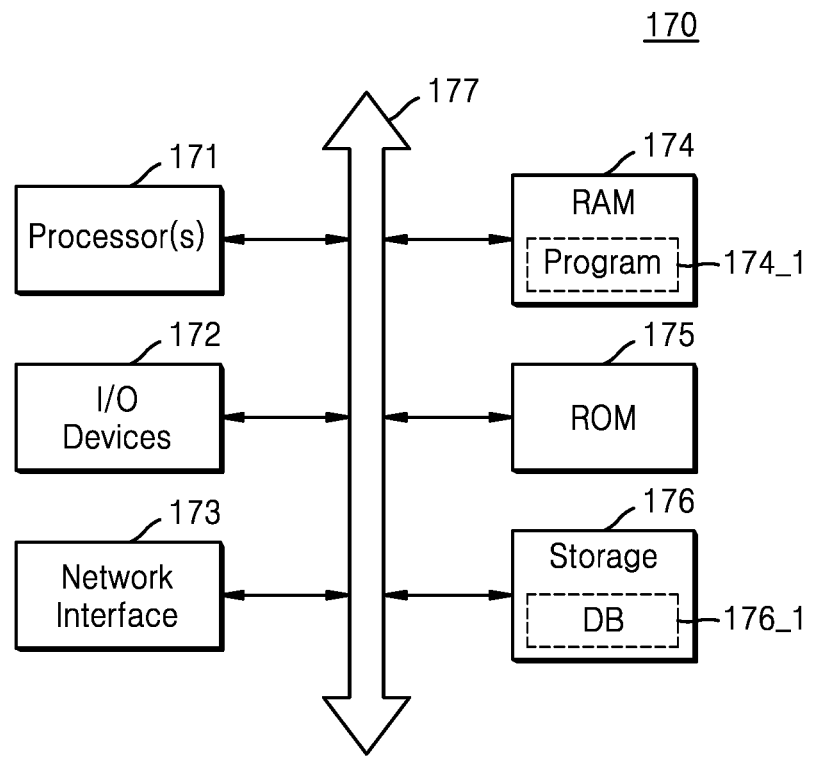
FIG. 31 is a block diagram illustrating a computer system according to an embodiment of the inventive concept.

FIG. 31 is a block diagram illustrating a computer system 170 according to an embodiment of the inventive concept. Referring to FIG. 31, the substrate inspection method 1000 described with reference to FIGS. 1 to 16 may be performed by the computer system 170. In some embodiments, the substrate inspection device 2000 described with reference to FIGS. 17 to 30 may be implemented by the computer system 170.

The computer system 170 may include at least one computing device. The at least one computing device may include stationary devices such as a desktop computer, a workstation, and a server or portable devices such as a laptop computer, a tablet personal computer (PC), and a smartphone. The computer system 170 may include a processor 171, input/output devices 172, a network interface 173, random access memory (RAM) 174, read-only memory (ROM) 175, and a storage device 176. The processor 171, the input/output devices 172, the network interface 173, the RAM 174, the ROM 175, and the storage device 176 may be connected to a bus 177 and communicate with each other via the bus 177.

The processor 171 may be referred as a processing unit and include at least one core, e.g., a microprocessor, an application processor (AP), a digital signal processor (DSP), and a graphics processing unit (GPU), capable of executing a random instruction set (e.g., Intel Architecture-32 (IA-32), 64-bit extended IA-32, x86-64, PowerPC, Sparc, million instructions per second (MIPS), advanced reduced instruction set computer (RISC) machine (ARM), IA-64, or the like). For example, the processor 171 may access a memory, i.e., the RAM 174 or the ROM 175, via the bus 177 and execute instructions stored in the RAM 174 or the ROM 175.

The RAM 174 may store a program 174_1 for substrate inspection or at least a portion of the program 174_1, and the program 174_1 for substrate inspection may allow the processor 171 to perform a substrate inspection method. That is, the program 174_1 may include a plurality of instructions executable by the processor 171, and the plurality of instructions included in the program 174_1 may allow the processor 171 to perform a substrate inspection method.

The storage device 176 may not lose stored data even when power supplied to the computer system 170 is cut off. For example, the storage device 176 may include a non-volatile memory device or a storage medium such as a magnetic tape, an optical disc, or a magnetic disk. In addition, the storage device 176 may be detached from the computer system 170 The storage device 176 may store the program 174_1 according to an example embodiment of the inventive concept, and before the program 174_1 is executed by the processor 171, the program 174_1 or at least a portion of the program 174_1 may be loaded from the storage device 176 to the RAM 174. Alternatively, the storage device 176 may store a file created with a programming language, and the program 174_1 created from the file by a compiler or the like or at least a portion of the program 174_1 may be loaded to the RAM 174. In addition, as shown in FIG. 31, the storage device 176 may store a database 176_1, and the database 176_1 may include data required for substrate inspection.

The storage device 176 may store data to be processed by the processor 171 or data processed by the processor 171. That is, according to the program 174_1, the processor 171 may generate data by processing data stored in the storage device 176 and store the generated data in the storage device 176.

The input/output devices 172 may include input devices such as a keyboard and a pointing device and output devices such as a display device and a printer. For example, through the input/output devices 172, a user may trigger execution of the program 174_1 by the processor 171 and check result data.

The network interface 173 may provide access to a network outside the computer system 170. For example, the network may include a plurality of computer systems and communication links, and the communication links may include wired links, optical links, wireless links, or other random types of links.

Figure 32:
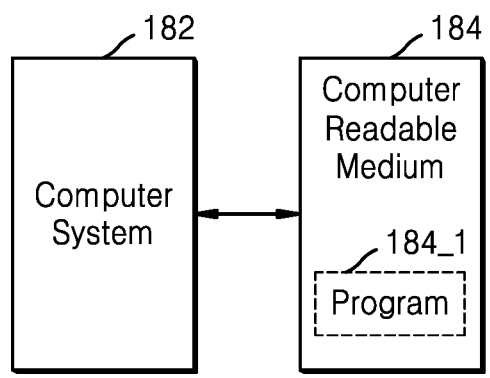
FIG. 32 is a block diagram illustrating a computer system for accessing a computer-readable medium, according to an embodiment of the inventive concept.

FIG. 32 is a block diagram illustrating a computer system 182 for accessing a computer-readable medium 184, according to an embodiment of the inventive concept. At least some of operations included in the substrate inspection method 1000 described with reference to FIGS. 1 to 16 may be performed by the computer system 182. The computer system 182 may access the computer-readable medium 184 and execute a program 184_1 stored in the computer-readable medium 184. In some embodiments, the computer system 182 and the computer-readable medium 184 may be integrally referred as a substrate inspection device.

Similarly to the storage device 176 of FIG. 31, the computer-readable medium 184 may include a non-volatile memory device or a storage medium such as a magnetic tape, an optical disc, or a magnetic disk. In addition, the computer-readable medium 184 may be detachable from the computer system 182.

While the inventive concept has been particularly shown and described with reference to embodiments thereof, it will be understood that various changes in form and details may be made therein without departing from the spirit and scope of the following claims.

What is claimed is:

1. A substrate inspection method, comprising:
    setting, by a computer system, a corresponding plurality of different optical conditions including at least one of a wavelength condition, an iris condition, a polarizing condition, and a light intensity condition, and acquiring, by the computer system, a plurality of defect of interest (DOI) images of a substrate having a DOI under the corresponding plurality of different optical conditions;
    acquiring, by the computer system, a plurality of DOI difference images from differences between the plurality of DOI images and a reference image;
    acquiring, by the computer system, a plurality of DOI difference-of-difference (DOD) images from differences between the plurality of DOI difference images;
    setting, by the computer system, two optical conditions corresponding to a DOI DOD image having the highest signal-to-noise ratio (SNR) among the plurality of DOI DOD images, as a first optical condition and a second optical condition;
    acquiring, by the computer system, a first image of the substrate under the first optical condition and a second image of the substrate under the second optical condition;
    acquiring, by the computer system, a first difference image that is a difference between the first image and the reference image, and a second difference image that is a difference between the second image and the reference image;
    acquiring, by the computer system, a DOD image that is a difference between the first difference image and the second difference image; and
    detecting, by the computer system, a low-SNR defect candidate region from the first difference image, the second difference image, and the DOD image to improve DOI detection performance.

2. The method of claim 1, wherein an SNR of each of two of the plurality of DOI difference images associated with two different optical conditions is less than 1.

3. The method of claim 1, further comprising:
    acquiring, by the computer system, an optimal image of the substrate under an optimal optical condition;
    acquiring, by the computer system, a non-optimal image of the substrate under a non-optimal optical condition;
    acquiring, by the computer system, an optimal difference image that is a difference between the optimal image and the reference image;
    acquiring, by the computer system, a non-optimal difference image that is a difference between the nonoptimal image and the reference image;
    detecting, by the computer system, an optimal defect candidate region from the optimal difference image;
    detecting, by the computer system, a non-optimal defect candidate region from the non-optimal difference image; and
    detecting, by the computer system, a high-SNR defect candidate region by subtracting the non-optimal defect candidate region from the optimal defect candidate region.

4. The method of claim 3, further comprising:
    setting, by the computer system, as the optimal optical condition, an optical condition corresponding to a DOI difference image having the highest SNR among the plurality of DOI difference images.

5. The method of claim 4, further comprising:
    acquiring, by the computer system, a plurality of uninterested defect images of the substrate having an uninterested defect, under a corresponding plurality of optical conditions;
    acquiring, by the computer system, a plurality of uninterested defect difference images, which are based on differences between the plurality of uninterested defect images and the reference image; and
    setting, by the computer system, as the non-optimal optical condition, an optical condition corresponding to an uninterested defect difference image having the highest SNR among the plurality of uninterested defect difference images.

6. The method of claim 4, further comprising:
    setting, by the computer system, as the non-optimal optical condition, an optical condition corresponding to a DOI difference image having the lowest SNR among the plurality of DOI difference images.

7. The method of claim 4, further comprising:
    acquiring, by the computer system, a plurality of process distribution images of the substrate having a process distribution, under the plurality of optical conditions;
    acquiring, by the computer system, a plurality of process distribution difference images, which are based on differences between the plurality of process distribution images and the reference image; and
    setting, by the computer system, as the non-optimal optical condition, an optical condition corresponding to a process distribution difference image having the highest SNR among the plurality of process distribution difference images.

8. The method of claim 4, further comprising:
    acquiring, by the computer system, an expanded image of the substrate under an expanded optical condition;
    acquiring, by the computer system, an expanded difference image, which is based on differences between the expanded image and the reference image;
    detecting, by the computer system, an expanded defect candidate region from the expanded difference image; and
    detecting, by the computer system, a high-SNR defect candidate region by subtracting the non-optimal defect candidate region from a union of the optimal defect candidate region with the expanded defect candidate region.

9. The method of claim 8, further comprising setting, by the computer system, as the expanded optical condition, an optical condition corresponding to a DOI difference image having the second highest SNR among the plurality of DOI difference images.

10. The method of claim 8, further comprising:
determining, by the computer system, whether there is a DOI in the high-SNR defect candidate region and the low-SNR defect candidate region, using an electron microscope.

11. A substrate inspection device comprising a computer system, the computer system comprising:
a processor; and
a memory storing instructions, when executed by the processor, causing the processor to:
set a corresponding plurality of different optical conditions including at least one of a wavelength condition, an iris condition, a polarizing condition, and a light intensity condition, and acquire a plurality of DOI images of a substrate having a DOI under the plurality of optical conditions;
acquire a plurality of DOI difference images from differences between the plurality of DOI images and a reference image;
acquire a plurality of DOI DOD images from differences between the plurality of DOI difference images;
set, as a first optical condition and a second optical condition, two optical conditions corresponding to a DOI DOD image having the highest signal to noise ratio (SNR) among the plurality of DOI DOD images;
acquire a first image of the substrate under the first optical condition and a second image of the substrate under the second optical condition;
acquire a first difference image that is a difference between the first image and the reference image, and a second difference image that is a difference between the second image and the reference image;
acquire a DOD image that is a difference between the first difference image and the second difference image; and
detect a low-SNR defect candidate region from the first difference image, the second difference image, and the DOD image to improve DOI detection performance.

12. The device of claim 11, wherein the memory stores the instructions, when executed by the processor, further causing the processor to:
acquire an optimal image of the substrate under an optimal optical condition;
acquire a non-optimal image of the substrate under a non-optimal optical condition;
acquire an optimal difference image that is a difference between the optimal image and the reference image;
acquire a non-optimal difference image that is a difference between the non-optimal image and the reference image;
detect an optimal defect candidate region from the optimal difference image;
detect a non-optimal defect candidate region from the non-optimal difference image; and
detect a high-SNR defect candidate region by subtracting the non-optimal defect candidate region from the optimal defect candidate region.

13. The device of claim 12, wherein the memory stores the instructions, when executed by the processor, further causing the processor to:
acquire a plurality of DOI images of the substrate having the DOI, under the plurality of optical conditions;
acquire the plurality of DOI difference images that are differences between the plurality of DOI images and the reference image; and
set, as the optimal optical condition, an optical condition corresponding to a DOI difference image having the highest SNR among the plurality of DOI difference images.

14. The device of claim 13, wherein the memory stores the instructions, when executed by the processor, further causing the processor to:
acquire a plurality of uninterested defect images of the substrate having an uninterested defect, under the plurality of optical conditions;
acquire a plurality of uninterested defect difference images that are differences between the plurality of uninterested defect images and the reference image; and
set, as the non-optimal optical condition, an optical condition corresponding to an uninterested defect difference image having the highest SNR among the plurality of uninterested defect difference images.

15. The device of claim 13, wherein the memory stores the instructions, when executed by the processor, further causing the processor to:
set, as the non-optimal optical condition, an optical condition corresponding to a DOI difference image having the lowest SNR among the plurality of DOI difference images.

16. The device of claim 13, wherein the memory stores the instructions, when executed by the processor, further causing the processor to:
acquire a plurality of process distribution images of the substrate having a process distribution, under the plurality of optical conditions;
acquire a plurality of process distribution difference images that are differences between the plurality of process distribution images and the reference image; and
set, as the non-optimal optical condition, an optical condition corresponding to a process distribution difference image having the highest SNR among the plurality of process distribution difference images.

17. The device of claim 13, wherein the memory stores the instructions, when executed by the processor, further causing the processor to:
acquire an expanded image of the substrate in an expanded optical condition;
acquire an expanded difference image that is a difference between the expanded image and the reference image;
detect an expanded defect candidate region from the expanded difference image; and
detect a high-SNR defect candidate region by subtracting the non-optimal defect candidate region from a union of the optimal defect candidate region with the expanded defect candidate region.

18. The device of claim 17, wherein the memory stores the instructions, when executed by the processor, further causing the processor to:

set, as the expanded optical condition, an optical condition corresponding to a DOI difference image having the second highest SNR among the plurality of DOI difference images.

19. A substrate inspection method, comprising:
    detecting, by a computer system, a high-signal to noise ratio (SNR) defect candidate region;
    detecting, by the computer system, a low-SNR defect candidate region; and
    determining, by the computer system and using an electron microscope, whether there is a defect of interest (DOI) in the low-SNR defect candidate region and/or the high-SNR defect candidate region;
    wherein the detecting of the low-SNR defect candidate region comprises:
        setting, by the computer system, a first optical condition and a second optical condition, the first and second optical conditions including at least one of a wavelength condition, an iris condition, a polarizing condition, and a light intensity condition;
        acquiring, by the computer system, a first image of a substrate under the first optical condition and a second image of the substrate under the second optical condition;
        acquiring, by the computer system, a first difference image based on a difference between the first image and a reference image, and a second difference image based on a difference between the second image and the reference image;
        acquiring, by the computer system, a difference-of-difference (DOD) image that is a difference between the first difference image and the second difference image; and
        detecting, by the computer system, the low-SNR defect candidate region from the first difference image, the second difference image, and the DOD image to improve DOI detection performance, and
    wherein the detecting of the high-SNR defect candidate region comprises:
        acquiring, by the computer system, an optimal image of the substrate under an optimal optical condition;
        acquiring, by the computer system, an optimal difference image based on a difference between the optimal image and the reference image; and
        acquiring, by the computer system, the high-SNR defect candidate region from the optimal difference image to increase DOI detection probability.

20. The method of claim 19, wherein the setting of the first optical condition and the second optical condition comprises:
    acquiring, by the computer system, a plurality of DOI images of the substrate having the DOI, under a plurality of optical conditions;
    acquiring, by the computer system, a plurality of DOI difference images based on differences between the plurality of DOI images and the reference image;
    acquiring, by the computer system, a plurality of DOI DOD images based on differences between the plurality of DOI difference images; and
    setting, by the computer system, as the first optical condition and the second optical condition, two optical conditions corresponding to a DOI DOD image having the highest SNR among the plurality of DOI DOD images.

* * * * *